(12) United States Patent
Koyama

(10) Patent No.: US 12,742,699 B2
(45) Date of Patent: Sep. 22, 2026

(54) DATA PROCESSING DEVICE AND METHOD

(71) Applicant: Hitachi, Ltd., Tokyo (JP)

(72) Inventor: Akihiro Koyama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 387 days.

(21) Appl. No.: 18/507,336

(22) Filed: Nov. 13, 2023

(65) Prior Publication Data

US 2024/0310232 A1 Sep. 19, 2024

(30) Foreign Application Priority Data

Mar. 13, 2023 (JP) ................................ 2023-038882

(51) Int. Cl.
*G01M 3/24* (2006.01)

(52) U.S. Cl.
CPC .................................. *G01M 3/243* (2013.01)

(58) Field of Classification Search
None
See application file for complete search history.

(56) References Cited

U.S. PATENT DOCUMENTS

2021/0116323 A1* 4/2021 Shinoda .................. G01M 3/24

FOREIGN PATENT DOCUMENTS

JP 2006-138831 A 6/2006
JP 2015-075440 A 4/2015
JP 2020-076646 A 5/2020
JP 2020-085515 A 6/2020
WO WO-2017199455 A1 * 11/2017 ............. G01M 3/24
WO 2020095538 A1 5/2020

OTHER PUBLICATIONS

Search Report mailed Apr. 9, 2024 in European Application No. 23209244.5.
Office Action mailed Jan. 27, 2026 in Japanese Application No. 2023-038882.

* cited by examiner

*Primary Examiner* — Daniel S Larkin
(74) *Attorney, Agent, or Firm* — Miles & Stockbridge, P.C.

(57) ABSTRACT

Provided is a technique capable of detecting a fluid leakage with a reduced influence of an environmental vibration. A data processing device that determines whether a fluid leaks from a pipeline network of the fluid based on a waveform of a vibration intensity measured from the pipeline network, the data processing device including: a memory configured to store a software program; and a processor configured to execute the software program. The processor acquires a plurality of pieces of waveform data of vibration intensities measured at different times from the pipeline network, calculates an evaluation value for evaluating how suitable or unsuitable the plurality of pieces of waveform data are for determining a presence or absence of a fluid leakage, selects waveform data to be used for determining a presence or absence of a fluid leakage from the plurality of pieces of waveform data based on the evaluation value, extracts a periodic characteristic from an autocorrelation coefficient of a vibration intensity of the selected waveform data, and determines whether the fluid leaks from the pipeline network based on a relationship between periodic characteristics of the selected waveform data.

13 Claims, 36 Drawing Sheets

Figure 3:
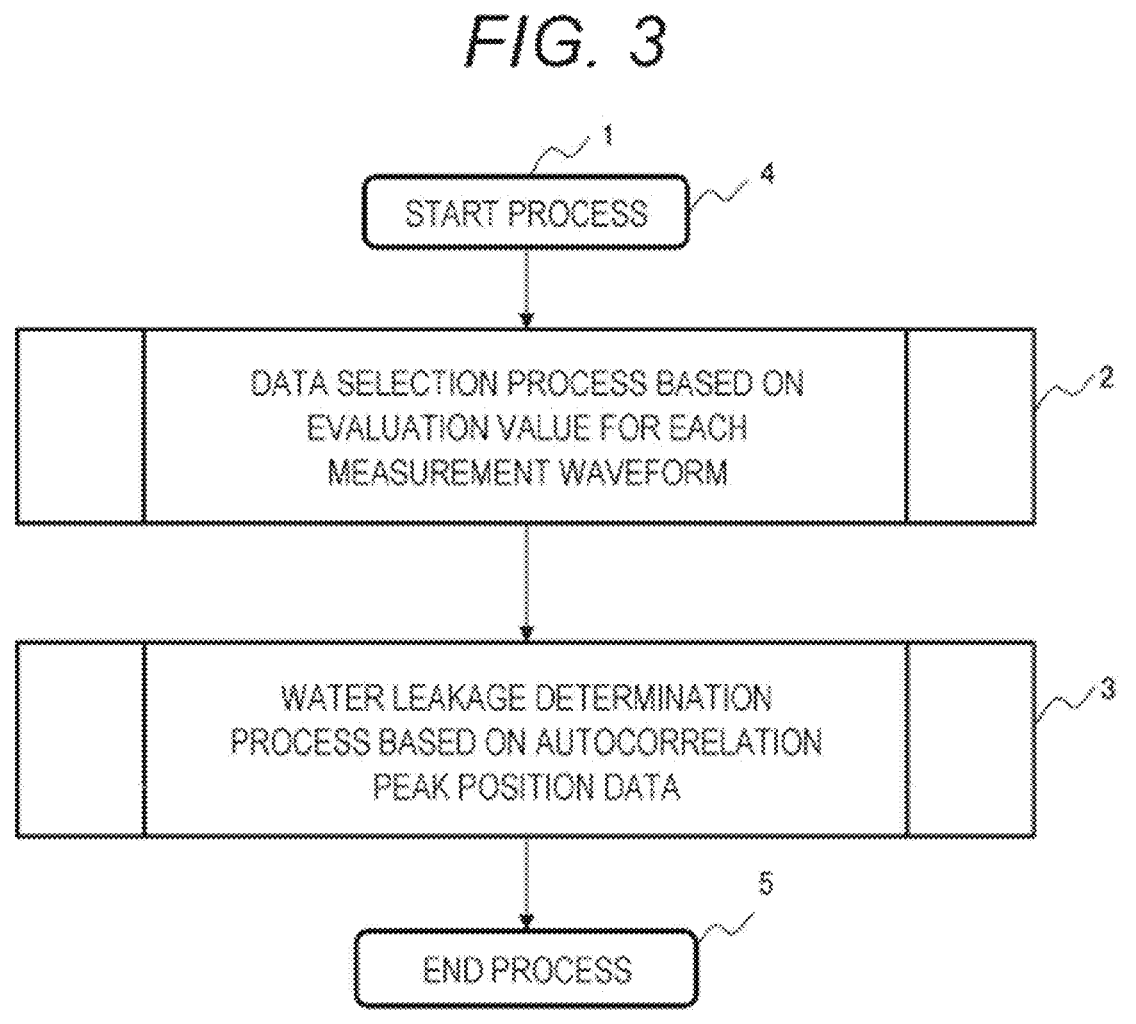

START PROCESS

4

DATA SELECTION PROCESS BASED ON EVALUATION VALUE FOR EACH MEASUREMENT WAVEFORM

2

WATER LEAKAGE DETERMINATION PROCESS BASED ON AUTOCORRELATION PEAK POSITION DATA

3

5

END PROCESS

FIG. 8

MEASUREMENT WAVEFORM DATA LIST 151

| DATA NAME (152) | MEASUREMENT TIME POINT D (153) | MEASUREMENT TIME T (154) | INDEX E (155) | EVALUATION VALUE S (156) | VALID DATA IDENTIFIER V (157) |
|---|---|---|---|---|---|
| MEASUREMENT WAVEFORM 1 | 2022/8/1 0:00 | 10 | 1 | 5.8 | 1 |
| MEASUREMENT WAVEFORM 2 | 2022/8/1 6:00 | 10 | 2 | 10.1 | 1 |
| MEASUREMENT WAVEFORM 3 | 2022/8/1 12:00 | 10 | 3 | 16.4 | 1 |
| MEASUREMENT WAVEFORM 4 | 2022/8/1 18:00 | 10 | 4 | 3.2 | 1 |

FIG. 9

MEASUREMENT WAVEFORM DATA LIST SORTED BY EVALUATION VALUE S 161

| DATA NAME (152) | MEASUREMENT TIME POINT D (153) | MEASUREMENT TIME T (154) | INDEX E (155) | EVALUATION VALUE S (156) | VALID DATA IDENTIFIER V (157) |
|---|---|---|---|---|---|
| MEASUREMENT WAVEFORM 1 | 2022/8/1 18:00 | 10 | 4 | 3.2 | 1 |
| MEASUREMENT WAVEFORM 2 | 2022/8/1 0:00 | 10 | 1 | 5.8 | 1 |
| MEASUREMENT WAVEFORM 3 | 2022/8/1 6:00 | 10 | 2 | 10.1 | 1 |
| MEASUREMENT WAVEFORM 4 | 2022/8/1 12:00 | 10 | 3 | 16.4 | 1 |

FIG. 10

MEASUREMENT WAVEFORM LIST FOR SELECTING W MEASUREMENT WAVEFORMS 171

| DATA NAME (152) | MEASUREMENT TIME POINT D (153) | MEASUREMENT TIME T (154) | INDEX E (155) | EVALUATION VALUE S (156) | VALID DATA IDENTIFIER V (157) |
|---|---|---|---|---|---|
| MEASUREMENT WAVEFORM 1 | 2022/8/1 18:00 | 10 | 4 | 3.2 | 1 |
| MEASUREMENT WAVEFORM 2 | 2022/8/1 0:00 | 10 | 1 | 5.8 | 1 |
| MEASUREMENT WAVEFORM 3 | 2022/8/1 6:00 | 10 | 2 | 10.1 | 0 |
| MEASUREMENT WAVEFORM 4 | 2022/8/1 12:00 | 10 | 3 | 16.4 | 0 |

W=2

ACQUIRE MEASUREMENT WAVEFORMS HAVING VALID DATA IDENTIFIER V OF 1 FROM TOP TO W-TH MEASUREMENT WAVEFORM, W BEING SELECTION NUMBER

| TIME POINT | FIRST DAY | SECOND DAY | THIRD DAY | FOURTH DAY |
|---|---|---|---|---|
| 0 | MEASUREMENT | MEASUREMENT | | MEASUREMENT |
| 1 | MEASUREMENT | | MEASUREMENT | MEASUREMENT |
| 2 | MEASUREMENT | | | MEASUREMENT |
| 3 | MEASUREMENT | | | MEASUREMENT |
| 4 | MEASUREMENT | | | MEASUREMENT |
| 5 | MEASUREMENT | | | MEASUREMENT |
| 6 | MEASUREMENT | MEASUREMENT | | MEASUREMENT |
| 7 | MEASUREMENT | | MEASUREMENT | MEASUREMENT |
| 8 | MEASUREMENT | | | MEASUREMENT |
| 9 | MEASUREMENT | | | MEASUREMENT |
| 10 | MEASUREMENT | | | MEASUREMENT |
| 11 | MEASUREMENT | | | MEASUREMENT |
| 12 | MEASUREMENT | MEASUREMENT | | MEASUREMENT |
| 13 | MEASUREMENT | | MEASUREMENT | MEASUREMENT |
| 14 | MEASUREMENT | | | MEASUREMENT |
| 15 | | | | |
| 16 | | | | |
| 17 | | | | |
| 18 | | MEASUREMENT | | |
| 19 | | | MEASUREMENT | |
| 20 | | | | |
| 21 | | | | |
| 22 | | | | |
| 23 | | | | |

| | |
|---|---|
| MEASUREMENT | MEASUREMENT DATA SELECTED BASED ON EVALUATION VALUE S |
| MEASUREMENT | MEASUREMENT DATA |
| MEASUREMENT | MEASUREMENT DATA WITH WHICH PRESENCE OF WATER LEAKAGE IS DETERMINED |

FIG. 31

EVALUATION VALUE CALCULATION MODEL 101

101

EVALUATION VALUE CALCULATION MODEL DEFINITION 241

241

EVALUATION VALUE S $= \alpha 0 + \alpha 1 * X(T1) + \alpha 2 * X(T1)^2 + \ldots + \alpha N * X(Tm)^N$

EVALUATION VALUE CALCULATION MODEL COEFFICIENT TABLE 242

243 244 245 246 247

| TIME [SECOND] | CONSTANT α0 | FIRST COEFFICIENT α1 | SECOND COEFFICIENT α2 | ... | N-TH COEFFICIENT αN |
|---|---|---|---|---|---|
| T1 | 1.5 | 2 | 1 | ... | 0.8 |
| T2 | 7 | 4.2 | 0 | ... | 5 |
| ... | ... | ... | ... | ... | ... |
| Tm | 4 | 10 | 2.5 | ... | 2 |

FIG. 32

EVALUATION VALUE CALCULATION MODEL 101

101

EVALUATION VALUE CALCULATION MODEL DEFINITION 361

361

EVALUATION VALUE S $= \alpha0 + \alpha1 * dX(T1)/dt + \alpha2 * dX(F1)^2 /dt^2 + \ldots + \alpha N * dX(Fm)^N /dt^N$

EVALUATION VALUE CALCULATION MODEL COEFFICIENT TABLE 242

243 244 245 246 247

| TIME [SECOND] | CONSTANT α0 | FIRST COEFFICIENT α1 | SECOND COEFFICIENT α2 | ... | N-TH COEFFICIENT αN |
|---|---|---|---|---|---|
| T1 | 1.5 | 2 | 1 | ... | 0.8 |
| T2 | 7 | 4.2 | 0 | ... | 5 |
| ... | ... | ... | ... | ... | ... |
| Tm | 4 | 10 | 2.5 | ... | 2 |

FIG. 34

EVALUATION VALUE CALCULATION MODEL 101

101

EVALUATION VALUE CALCULATION MODEL DEFINITION 221

221

EVALUATION VALUE S $= \alpha 0 + \alpha 1 * X(F1) + \alpha 2 * X(F1)^2 + \ldots + \alpha N * X(Fm)^N$

EVALUATION VALUE CALCULATION MODEL COEFFICIENT TABLE 222

223 224 225 226 227

| FREQUENCY [Hz] | CONSTANT α0 | FIRST COEFFICIENT α1 | SECOND COEFFICIENT α2 | ... | N-TH COEFFICIENT αN |
| --- | --- | --- | --- | --- | --- |
| F1 | 1.5 | 2 | 1 | ... | 0.8 |
| F2 | 7 | 4.2 | 0 | ... | 5 |
| ... | ... | ... | ... | ... | ... |
| Fm | 4 | 10 | 2.5 | ... | 2 |

FIG. 35

EVALUATION VALUE CALCULATION MODEL 101

101

EVALUATION VALUE CALCULATION MODEL DEFINITION 351

351

EVALUATION VALUE S =

$$\mathrm{MAX}(\alpha 1 * (dX(F1)/df), \alpha 2 * (dX(F1)/df)^2, \ldots, \alpha N * ((dX(FM)/df)^N)$$

EVALUATION VALUE CALCULATION MODEL COEFFICIENT TABLE 222

223 224 225 226 227

| FREQUENCY [Hz] | CONSTANT $\alpha 0$ | FIRST COEFFICIENT $\alpha 1$ | SECOND COEFFICIENT $\alpha 2$ | ... | N-TH COEFFICIENT $\alpha N$ |
|---|---|---|---|---|---|
| F1 | 1.5 | 2 | 1 | ... | 0.8 |
| F2 | 7 | 4.2 | 0 | ... | 5 |
| ... | ... | ... | ... | ... | ... |
| Fm | 4 | 10 | 2.5 | ... | 2 |

DATA PROCESSING DEVICE AND METHOD

BACKGROUND OF THE INVENTION

1. Field of the Invention

The present invention relates to a technique for processing data on a vibration sensor for determining presence or absence of a leakage in each pipeline in a fluid pipeline network in infrastructures and factories.

2. Description of Related Art

JP2015-75440A (PTL 1) proposes a detection system using a vibration sensor as a technique for detecting a leakage in a pipeline network serving as an infrastructure or a pipeline network provided in a factory. PTL 1 proposes a method of determining the presence or absence of a leakage using sound pressure values of data acquired at different time points.

The pipeline network serving as an infrastructure or the pipeline network provided in a factory may be set at a location where various environmental vibrations such as a vibration caused by traveling of an automobile or a train or a vibration caused by operations of a large machine occur. There are various ways of generating the environmental vibrations. Some environmental vibrations continue for a long time in one day, while some environmental vibrations intermittently occur frequently for many days in a row.

The method of PTL 1 determines a water leakage using data intermittently measured a plurality of times in one day. In this method, there is room for improvement in a possibility of erroneous determination of a presence or absence of the water leakage due to the environmental vibration at a location where the environmental vibrations that continue for a long time in one day occur or a place where the environmental vibrations that intermittently occur frequently for many days occur. In addition, the ways of generating the environmental vibration vary depending on the location and the date and time, and it is not easy to find and adjust a most suitable measurement time point for each location of the pipeline network.

SUMMARY OF THE INVENTION

An object of the present disclosure is to provide a technique capable of detecting a fluid leakage with a reduced influence of an environmental vibration.

A data processing device according to an aspect included in the present disclosure is a data processing device that determines whether a fluid leaks from a pipeline network of the fluid based on a waveform of a vibration intensity measured from the pipeline network, the data processing device including: a memory configured to store a software program; and a processor configured to execute the software program. The processor acquires a plurality of pieces of waveform data of vibration intensities measured at different times from the pipeline network, calculates an evaluation value for evaluating how suitable or unsuitable the plurality of pieces of waveform data are for determining a presence or absence of a fluid leakage, selects waveform data to be used for determining a presence or absence of a fluid leakage from the plurality of pieces of waveform data based on the evaluation value, extracts a periodic characteristic from an autocorrelation coefficient of a vibration intensity of the selected waveform data, and determines whether the fluid leaks from the pipeline network based on a relationship between periodic characteristics of the selected waveform data.

According to one aspect of the present disclosure, it is possible to detect a fluid leakage with a reduced influence of an environmental vibration.

BRIEF DESCRIPTION OF THE DRAWINGS

FIG. 3 is a diagram showing an example of a flowchart of a data process for water leakage detection according to a first embodiment.

FIG. 8 is a diagram showing an example of a measurement waveform data list before rearrangement.

FIG. 9 is a diagram showing an example of a measurement waveform data list after the rearrangement.

FIG. 10 is a diagram showing a measurement waveform data list for selecting W measurement waveforms.

FIG. 17 is a schematic diagram showing measurement time points when a time point at which a measurement waveform is acquired is changed daily.

FIG. 31 is a diagram showing an example of a configuration of an evaluation value calculation model.

FIG. 32 is a diagram showing another example of the configuration of the evaluation value calculation model.

FIG. 34 is a diagram showing another example of the configuration of the evaluation value calculation model.

FIG. 35 is a diagram showing still another example of the configuration of the evaluation value calculation model.

DESCRIPTION OF EMBODIMENTS

Figure 1:
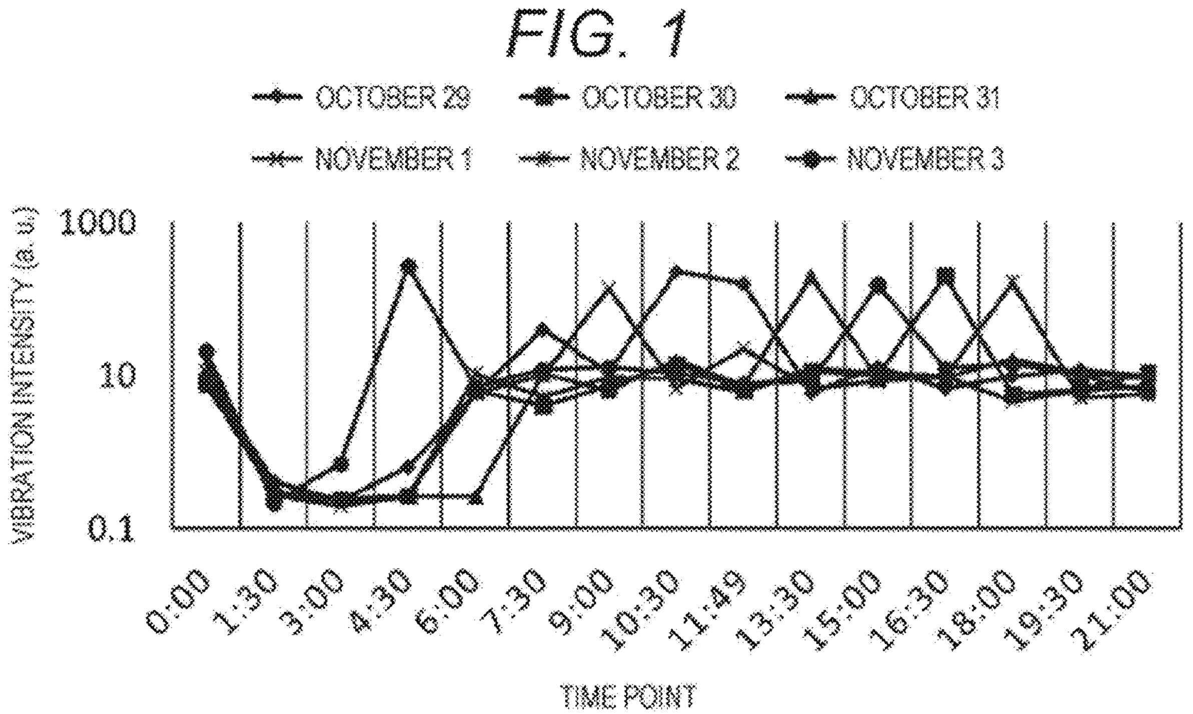
FIG. 1 is a diagram showing vibration intensities measured for six days by a vibration sensor provided at a location along an arterial road where a water leakage does not occur for each time zone.

Embodiments of the invention will be described below with reference to the drawings. The embodiments are examples illustrating the invention, and omission and simplification are appropriately made for a clarified description. The invention can be implemented in other various forms. Unless otherwise specified, the number of respective components may be singular or plural.

In order to facilitate understanding of the invention, a position, size, shape, range, or the like of each component shown in the drawings may not represent an actual position, size, shape, range, or the like of an object. Therefore, the invention is not necessarily limited to the position, size, shape, range, or the like of an object shown in the drawings.

Examples of various types of information may be described by expressions such as "table", "list", and "queue", but the various types of information may be expressed by a data structure other than these expressions. For example, the various types of information such as "XX table", "XX list", and "XX queue" may be "XX information". When identification information is described, expressions such as "identification information", "identifier", "name", "ID", and "number" are used, but these expressions may be replaced with one another.

When there are a plurality of constituent elements having a same or similar function, different subscripts may be attached to the same reference numeral. Further, when there is no need to distinguish the plurality of components, the subscripts may be omitted to perform the description.

In the embodiment, a process performed by executing a program may be described. Here, a computer executes the program by a processor (for example, a CPU or a GPU), and performs the process, that is defined by the program, using a storage resource (for example, a memory), an interface device (for example, a communication port), or the like. Therefore, a subject of the process performed by executing the program may be the processor. Similarly, the subject of the process performed by executing the program may be a controller, a device, a system, a computer, or a node including the processor. The subject of the process performed by executing the program may be a calculation unit, and may include a dedicated circuit that executes a specific process. Here, the dedicated circuit refers to, for example, a field programmable gate array (FPGA), an application specific integrated circuit (ASIC), and a complex programmable logic device (CPLD).

The program may be installed on a computer from a program source. The program source may be, for example, a program distribution server or a storage medium readable by a computer. When the program source is a program distribution server, the program distribution server may include a processor and a storage resource that stores a program to be distributed, and the processor of the program distribution server may distribute the program to be distributed to another computer. In the embodiment, two or more programs may be implemented as one program, or one program may be implemented as two or more programs.

First Embodiment

Here, a process of determining a presence or absence of a leakage of a fluid from a pipeline using data acquired by vibration sensors provided at various locations of a pipeline network through which the fluid flows in an infrastructure, a factory, or the like is referred to as "a data process for water leakage detection". Here, as one example, the pipeline network is a pipeline network of water pipes, and the fluid flowing through the pipeline network is water. The data process for water leakage detection in the present embodiment facilitates accurate detection of a vibration generated when water flowing through a pipeline network of water pipes leaks. The vibration sensor can be provided at various locations such as a water control valve on the pipeline network, can detect a vibration caused by a water (fluid) leakage (for example, detect a vibration based on a vibration intensity of a predetermined frequency, a detection time point, or a feature related to stationarity of a vibration), and can output the vibration intensity of the predetermined frequency or information indicating that a vibration is occurring to a leakage monitoring device to which the vibration sensor is connected. The vibration detected by the vibration sensor is not limited to a vibration transmitted through piping, but also includes a vibration derived from a sound transmitted through air or liquid. The leakage monitoring device is a device that executes the data process for water leakage detection to detect a fluid leakage from a pipeline network. Hereinafter, the leakage monitoring device may be referred to as a data processing device.

Turbulence at a water leakage hole jet port is a reason of an occurrence of the water leakage vibration, which is a premise of the present embodiment. The water leakage hole jet port is a hole formed in a pipeline, and is a location from which water is jetted. Hereinafter, the water leakage hole jet port is also simply referred to as a water leakage hole. In high-pressure piping, a locally steep pressure fluctuation occurs in the vicinity of a minute water leakage hole. At this time, in the vicinity of the water leakage hole, a cavitation phenomenon in which minute bubbles are repeatedly generated and eliminated due to a pressure fluctuation in water occurs. The repetitive movement of the periodic generation and elimination of bubbles caused by the cavitation phenomenon generates a unique impact sound in the vicinity of the water leak hole. The generated impact sound is transmitted through piping and a fluid inside the piping. An occurrence of a water leakage can be detected by measuring the periodic impact sound with a sensor terminal. In order to accurately specify the occurrence of the water leakage, it is necessary to accurately extract a periodic component observed when the water leakage occurs. Generally, since a vibration due to a water leakage continues to occur regardless of a time zone, it can be determined that there is a water leakage if a vibration having the same periodic feature can be detected in different time zones.

In the present embodiment, an autocorrelation function is used to grasp periodic characteristics of a signal itself. The autocorrelation function is a function for acquiring a correlation between a certain signal $p(t)$ and a signal $p(t+\tau)$ obtained by shifting the signal $p(t)$ in time, and is defined by the following Equation (1).

$$G(\tau) = \lim_{T\to\infty} \frac{1}{T} \int_{-\frac{T}{2}}^{\frac{T}{2}} p(t)p(t+\tau)dt \qquad \text{Equation 1}$$

When the signal $p(t)$ has a periodic component of a period $\tau 0$, an autocorrelation function $G(\tau)$ shows a peak at $G(\tau 0)$, and thus, by acquiring peak information of the autocorrelation function, it is possible to determine whether the signal $p(t)$ has periodicity.

On the other hand, among environmental vibrations derived from ambient noise which is not a water leakage, there is an environmental vibration which has periodicity and intermittently occurs for a long time. When this type of environmental vibration is measured by the vibration sensor, it is erroneously detected that a water leakage occurs. A magnitude of the water leakage vibration caused by a water leakage attenuates and decreases as a distance from a location where the water leakage occurs increases. Therefore, in order to detect a water leakage at a location far away from a location where a water leakage occurs, it is necessary to make a determination based on a measurement waveform measured in a quiet time zone in which an environmental vibration becomes small and a minute water leakage vibration becomes relatively large with respect to the environmental vibration. From this point of view, it is also important to determine whether there is a vibration having a periodic characteristic unique to a water leakage using the autocorrelation function while preventing an influence of ambient noise.

Figure 2:
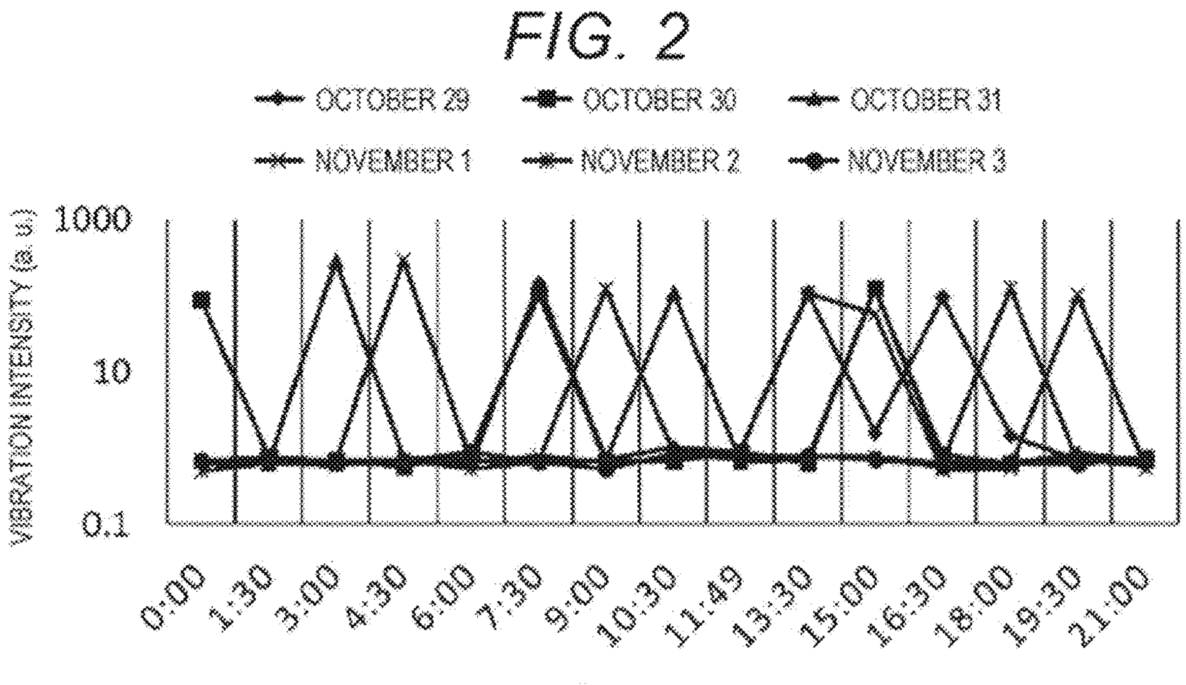
FIG. 2 is a diagram showing vibration intensities measured for six days by a vibration sensor provided at a place in a business district where a water leakage does not occur for each time zone.

FIG. 1 is a diagram showing vibration intensities measured for six days by a vibration sensor provided at a location along an arterial road where a water leakage does not occur for each time zone. FIG. 2 is a diagram showing vibration intensities measured for six days by a vibration sensor provided at a location in a business district where a water leakage does not occur for each time zone. FIGS. 1 and 2 show the vibration intensities caused by environmental vibrations in each environment. As can be seen from FIGS. 1 and 2, the vibration intensities may change by 100 times or more depending on the time zone. When a time zone in which such an environmental vibration occurs and a measurement time zone overlap, the environmental vibration influences peak information of the autocorrelation function, and it is not possible to correctly determine a water leakage. As shown in FIG. 1, the environmental vibration is generally larger in daytime in many cases. However, depending on the location, as shown in FIG. 2, there are also locations where an environmental vibration randomly occurs over the day and night. Therefore, it is not desirable to measure the vibration intensity by determining one time zone for various locations.

Thus, in the present embodiment, in order to determine a presence or absence of a water leakage vibration by using data in a time zone where the influence of the environmental vibration is small, a process of selecting data desirable for acquiring peak information of an autocorrelation function according to any evaluation function from a plurality of vibration waveforms intermittently measured and acquired is included. The data process for water leakage detection in the present embodiment will be described below.

<Processing Procedure>

FIG. 3 is a diagram showing an example of a flowchart of a data process for water leakage detection according to the first embodiment.

As shown in FIG. 3, in the data process for water leakage detection 1, when the process is started (step 4), the data processing device first executes a data selection process based on an evaluation value for each measurement waveform (step 2), then executes a water leakage determination process based on autocorrelation peak position data (step 3), and ends the process (step 5). Here, the evaluation value for each measurement waveform is a value for evaluating how suitable or unsuitable a measurement waveform is for determining the presence or absence of a water leakage. The data selection process based on the evaluation value for each measurement waveform is a process of calculating an evaluation value for each measurement waveform, selecting a measurement waveform to be used for the water leakage determination based on the calculated evaluation value, calculating an autocorrelation coefficient of the selected measurement waveform, and extracting a peak of the autocorrelation coefficient. Details of the data selection process based on the evaluation value for each measurement waveform will be described later. The water leakage determination process based on the autocorrelation peak position data is a process of determining the presence or absence of a water leakage based on a position of the peak of the autocorrelation coefficient calculated by the data selection process based on the evaluation value for each measurement waveform. The position of the peak is represented by a position on a time axis, that is, a time point. Details of the water leakage determination process based on the autocorrelation peak position data will be described later.

Figure 4:
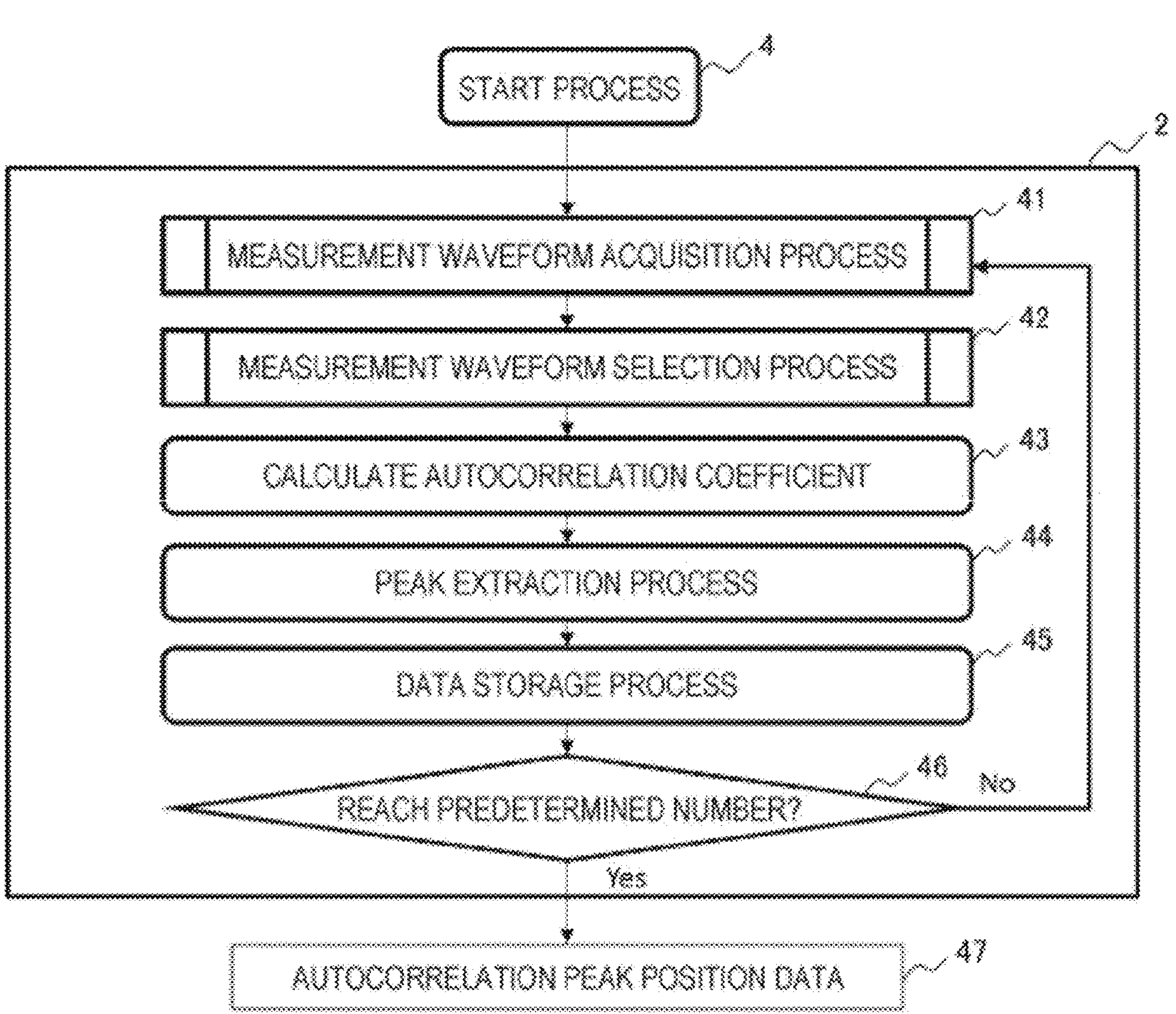
FIG. 4 is a diagram showing an example of a flowchart of a data selection process based on an evaluation value for each measurement waveform.

FIG. 4 is a diagram showing an example of a flowchart of the data selection process based on the evaluation value for each measurement waveform.

As shown in FIG. 4, in the data selection process based on the evaluation value for each measurement waveform in step 2, when the process is started, the data processing device executes a measurement waveform acquisition process (step 41), a measurement waveform selection process (step 42), an autocorrelation coefficient calculation process (step 43), a peak extraction process (step 44), and a data storage process (step 45), and determines whether the number of extracted autocorrelation peak positions reaches a predetermined number (step 46). In step 46, when the number of extracted autocorrelation peak positions does not reach the predetermined number, the data processing device returns to the measurement waveform acquisition process in step 41. When the number of extracted autocorrelation peak positions reaches the predetermined number, the data processing device outputs the autocorrelation peak position data 47 indicating the extracted autocorrelation peak positions.

The measurement waveform acquisition process (step 41) of FIG. 4 is a process of acquiring waveform data measured by the vibration sensor. The measurement waveform selection process (step 42) of FIG. 4 is a process of calculating an evaluation value of the measured waveform and selecting a waveform based on the evaluation value. The autocorrelation coefficient calculation process is a process of calculating an autocorrelation coefficient of the selected waveform. The peak extraction process is a process of extracting a peak of the autocorrelation coefficient of the selected waveform. The data storage process is a process of storing data indicating a position of the peak of the autocorrelation coefficient of each measurement waveform. Details of the measurement waveform acquisition process (step 41), the measurement waveform selection process (step 42), the autocorrelation coefficient calculation process, and the peak extraction process will be described later.

Figure 5:
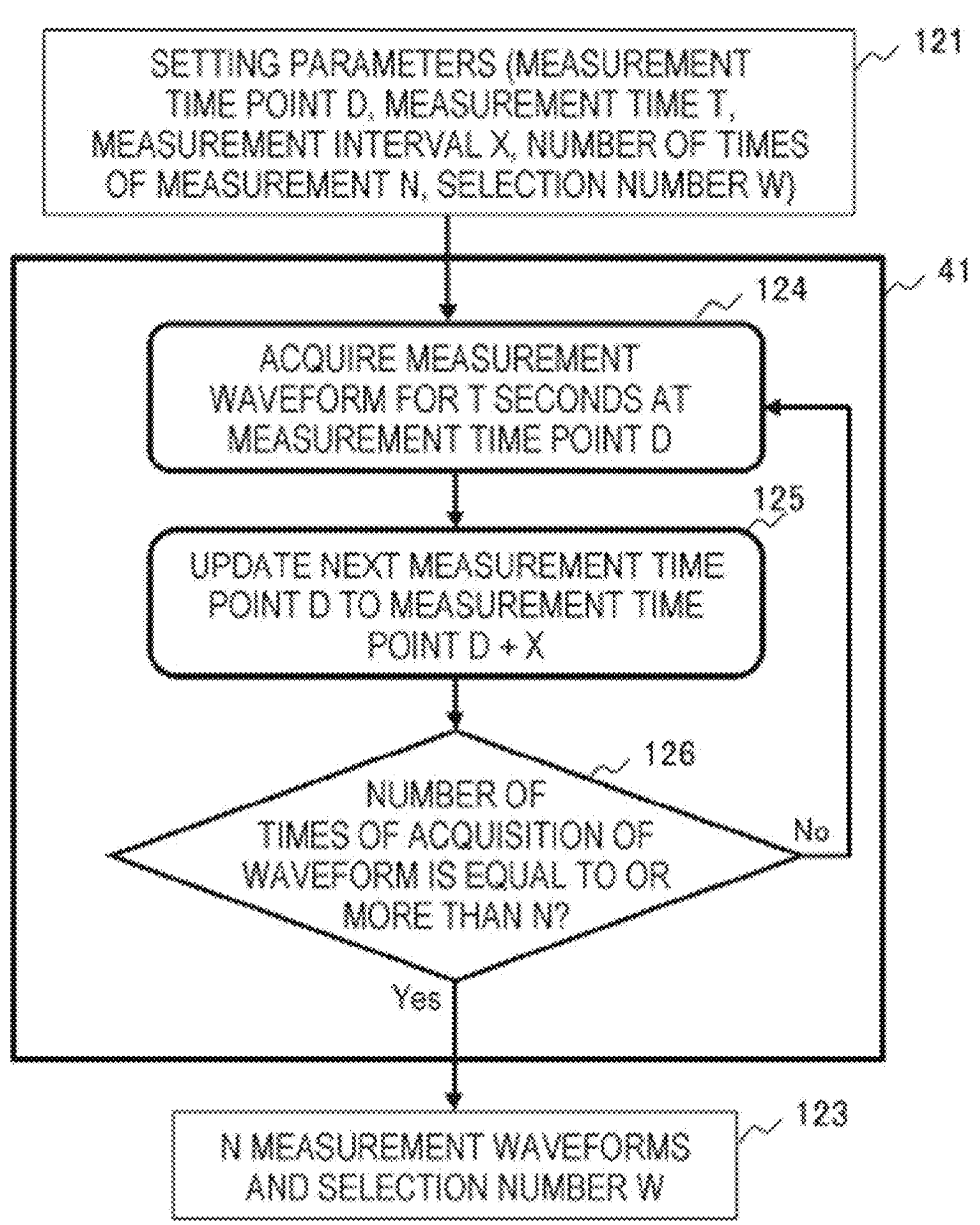
FIG. 5 is a diagram showing an example of a flowchart of a measurement waveform acquisition process.

FIG. 5 is a diagram showing an example of a flowchart of the measurement waveform acquisition process.

As shown in FIG. 5, in the measurement waveform acquisition process of step 41, the data processing device inputs setting parameters 121 including a measurement time point D, a measurement time T, a measurement interval X, the number of times of measurement N, a selection number W, and the like, acquires the measurement waveform for T seconds at the measurement time point D (step 124), updates a next measurement time point D to a measurement time point D+X (step 125), and determines whether the number of times of acquisition of the measurement waveform is equal to or more than the number of times of measurement N (step 126). The data processing device returns to step 124 if the number of times of acquisition of the measurement waveform is not N or more, and outputs data including N measurement waveforms and the set selection number W if the number of times of acquisition of the measurement waveform is N or more (step 123).

Figure 6:
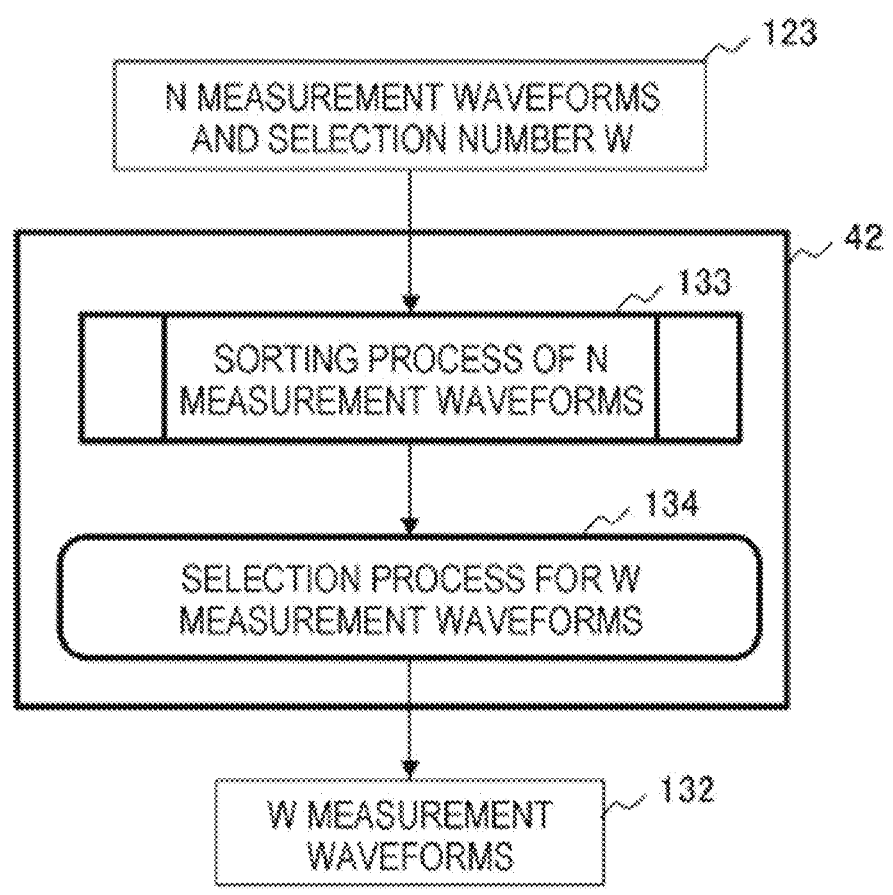
FIG. 6 is a diagram showing an example of a flowchart of a measurement waveform selection process.

FIG. 6 is a diagram showing an example of a flowchart of the measurement waveform selection process.

As shown in FIG. 6, in the measurement waveform selection process of step 42, with the N measurement waveforms and the set selection number W as inputs (step 123), the data processing device executes a sorting process of N measurement waveforms (step 133), executes a selection process for W measurement waveforms (step 134), and outputs the W measurement waveforms (step 132). The sorting process of N measurement waveforms is a process of calculating an evaluation value of each of the N measurement waveforms and rearranging the N measurement waveforms based on the evaluation values. The selection process for W measurement waveforms is a process of selecting W measurement waveforms to be used for the determination of the presence or absence of the water leakage from a higher order of the N measurement waveforms by using data output by the sorting process for N measurement waveforms as an input. Details of the sorting process of N measurement waveforms will be described later.

Figure 7:
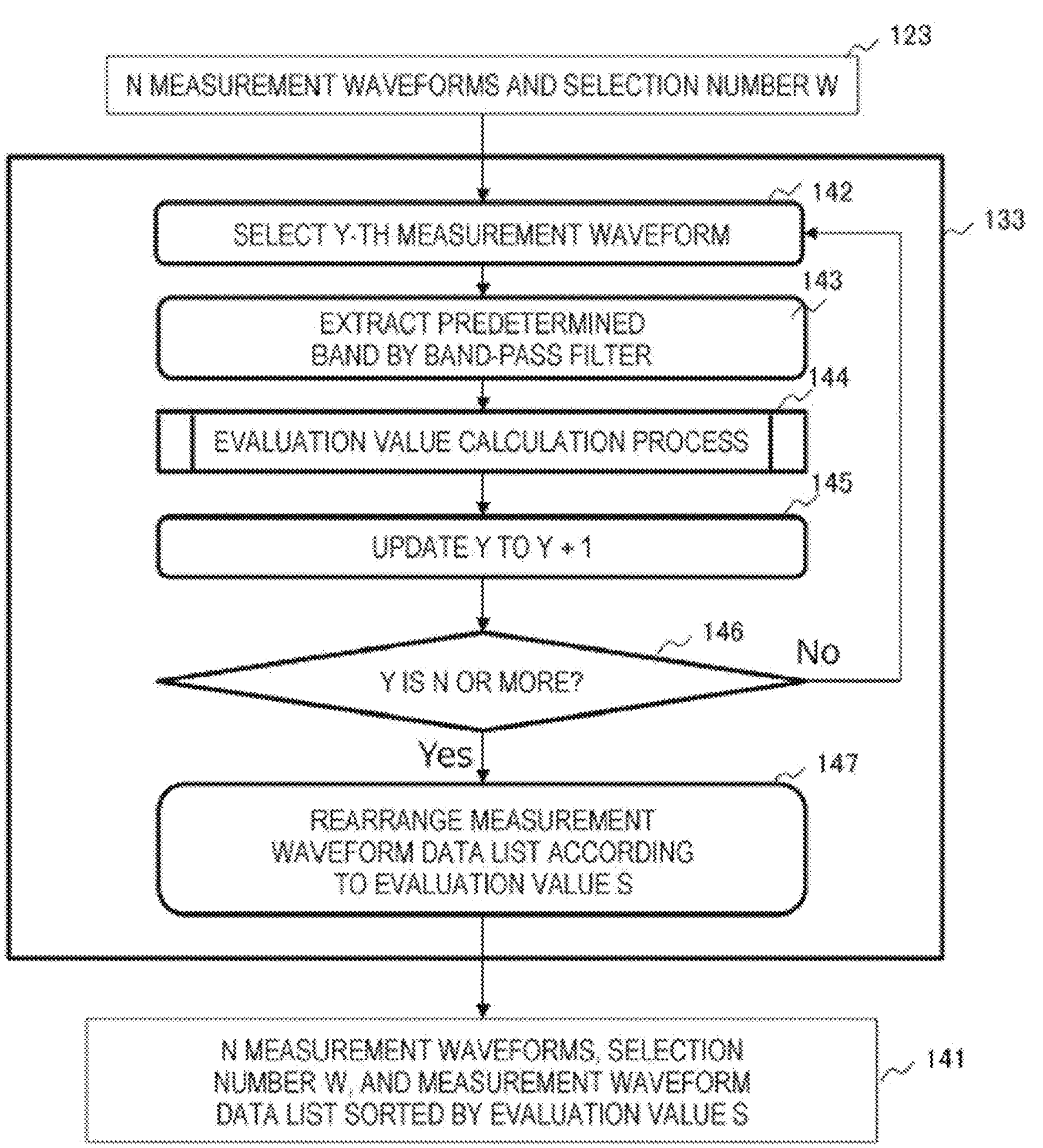
FIG. 7 is a diagram showing an example of a flowchart of a sorting process of N measurement waveforms.

FIG. 7 is a diagram showing an example of a flowchart of the sorting process of N measurement waveforms.

As shown in FIG. 7, in the sorting process of N measurement waveforms of step 133, with the N measurement waveforms and the set selection number W as the inputs (step 123) and Y as a variable having 1 as an initial value, the data processing device selects a Y-th measurement waveform from the N measurement waveforms (step 142), extracts a specific frequency band by a band-pass filter for the selected waveform (step 143), calculates a predetermined evaluation value S from data of the extracted frequency band by executing an evaluation value calculation process (step 144), increments Y to Y+1 (step 145), and determines whether the incremented new Y is equal to or more than the number of measurement waveforms N (step 146). If Y is less than N, the data processing device returns to step 142. If Y is equal to or more than N, the data processing device rearranges a measurement waveform data list described later according to the evaluation value S (step 147), and outputs data 141 including the N measurement waveforms, the selection number W, and the measurement waveform data list sorted according to the evaluation value S. This data 141 is an input of the selection process for the W measurement waveforms described above. Here, the evaluation value S may be an evaluation value indicating an intensity of an environmental vibration or an evaluation value corresponding to likelihood of a water leakage vibration. The evaluation value calculation process, that is, a calculation method of the evaluation value S will be described later. The selection number W may be a fixed value for each time of measurement, or may be changed for each time of measurement. In addition, the selection number W may be set to be dynamically changed according to a value of the number of times of measurement N, such as setting half of the number of times of measurement N (when N is an odd number, rounding down or rounding up to a decimal point) as the selection number W.

When the evaluation value S is the evaluation value indicating the intensity of the environmental vibration, the data processing device rearranges the measurement waveform data list in an ascending order of the evaluation values S in step 147, so that a measurement waveform suitable for determining the presence or absence of the water leakage, that is, a measurement waveform having a small evaluation value S can be preferentially selected. In addition, when the evaluation value S is the evaluation value corresponding to the likelihood of the water leakage vibration, the data processing device rearranges the measurement waveform data list in a descending order of the evaluation values S in step 147, so that a measurement waveform suitable for determining the presence or absence of the water leakage, that is, a measurement waveform having a large evaluation value S can be preferentially selected. Therefore, step 147 of rearranging the N measurement waveform data lists according to the evaluation values S may be performed according to either the ascending order or the descending order of the evaluation values S.

In addition, when the evaluation value S becomes an extremely small value or an extremely large value due to some errors occurring at the time of acquiring the measurement waveform, since the measurement waveform having such evaluation value S should not be selected, the data processing device may rearrange the measurement waveform data list in step 147, so that deviation or dispersion from an average value or a median value of the evaluation values S becomes the ascending order or the descending order.

FIG. 8 is a diagram showing an example of the measurement waveform data list before the rearrangement. The measurement waveform data list is record information related to measurement conditions, sensor states, and the like and associated with the measurement waveform, and a type of information to be recorded is not limited thereto. FIG. 9 is a diagram showing an example of the measurement waveform data list after the rearrangement. In the measurement waveform data list 151 shown in FIG. 8, a data name 152, a measurement time point D 153, a measurement time T 154, an index E 155, an evaluation value S 156, and a valid data identifier V 157 are recorded for each piece of data of the measurement waveform. FIG. 8 shows an example in which (referring back to FIGS. 5 to 7) the measurement interval X is 6 hours, the number of times of measurement N is 4, the selection number W is 2, and the measurement time T is 10 seconds, but the values that can be set are not limited to these. The valid data identifier V 157 is record information for determining whether the measurement waveform is used to determine the presence or absence of the water leakage. FIG. 9 shows a measurement waveform data list 161 obtained by rearranging the data of the measurement waveforms in the measurement waveform data list 151 of FIG. 8, such that the evaluation values S are in the ascending order. Any method may be used for the data processing device to rearrange the data of the measurement waveforms, for example, bubble sort, quick sort, heap sort, or the like may be used.

FIG. 10 is a diagram showing the selection process for the W measurement waveforms. Referring to FIG. 10, in a measurement waveform data list 171 for selecting W measurement waveforms, the W measurement waveforms are selected from a top of the measurement waveform data list 161 sorted by the evaluation values S of FIG. 9, the valid data identifier V 157 thereof is 1, and the valid data identifier V 157 is 0 for data that is not selected. This indicates that a measurement waveform with the valid data identifier V 157 being 1, for example, is used for determining the presence or absence of the water leakage, and a measurement waveform with the valid data identifier V 157 not being 1 is not used for determining the presence or absence of the water leakage. Here, W=2 is as an example. The selected W measurement waveforms corresponding to the measurement waveform data list 171 are used to determine the presence or absence of the water leakage.

Figure 11:
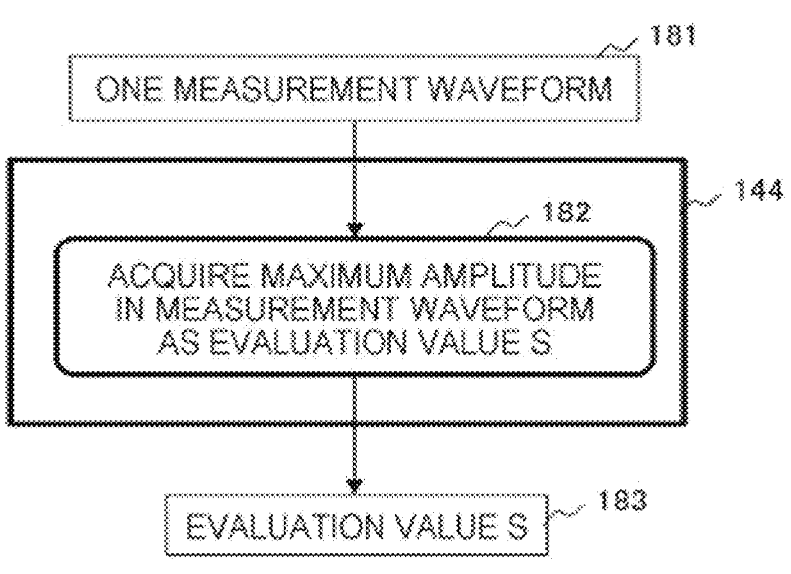
FIG. 11 is a diagram showing an example of a flowchart of an evaluation value calculation process.

FIG. 11 is a diagram showing an example of a flowchart of the evaluation value calculation process.

As shown in FIG. 11, in the evaluation value calculation process of step 144, the data processing device receives, as an input, one measurement waveform 181 from which a predetermined band is extracted by the band-pass filter in step 143, acquires a maximum amplitude in the one measurement waveform as the evaluation value S (step 182), and outputs the evaluation value S 183. A process of using the maximum amplitude as the evaluation value S can be easily implemented, and if a measurement waveform having a small evaluation value S is preferentially selected, it is possible to avoid a measurement waveform from having a large vibration intensity and having a high possibility of including an environmental vibration. However, the evaluation value calculation process according to the present embodiment is not limited to that shown in FIG. 11.

Figure 12:
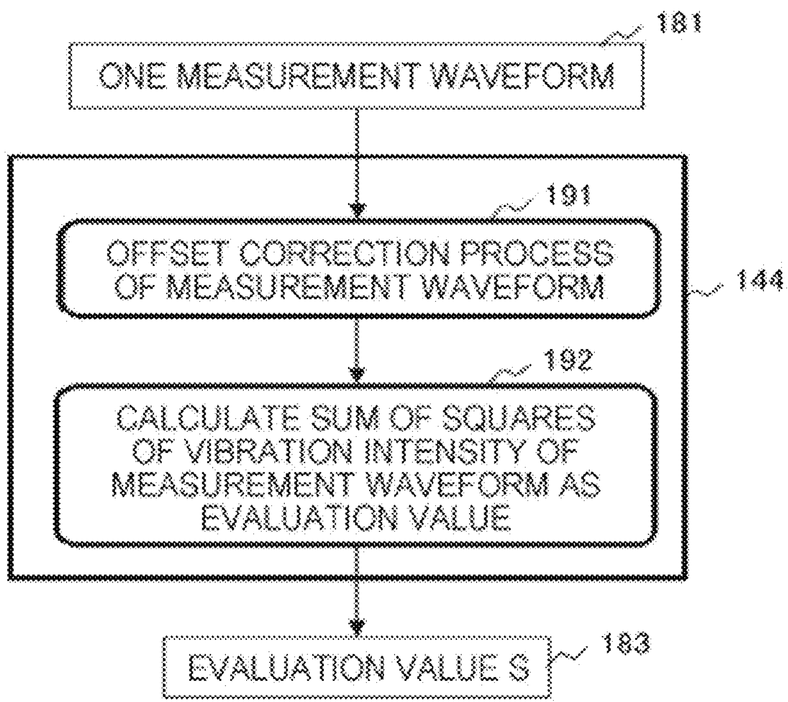
FIG. 12 is a diagram showing another example of the flowchart of the evaluation value calculation process.

FIG. 12 is a diagram showing another example of the flowchart of the evaluation value calculation process.

In the example of FIG. 12, in the evaluation value calculation process of step 144, first, the data processing device receives, as an input, one measurement waveform 181 from which the predetermined band is extracted by the band-pass filter in step 143, and executes an offset correction process of the measurement waveform (step 191). The offset correction process of the measurement waveform is a process of performing correction by applying an offset to the measurement waveform, so that an average value of the vibration intensities of the measurement waveforms at the time when the measurement waveforms are measured becomes zero. Subsequently, the data processing device calculates a sum of squares of the vibration intensities of the measurement waveforms subjected to the offset correction process of the measurement waveform as the evaluation value S 183 (step 192). When an environmental vibration is constantly included in the measurement waveform, the evaluation value S represents energy of the constant environmental vibration, and thus, if a measurement waveform having a small evaluation value S is selected, the measurement waveform less influenced by the environmental vibration can be used to determine the presence or absence of the water leakage.

In the evaluation value calculation processes shown in FIGS. 11 and 12, the evaluation value S is calculated from the vibration intensities of the measurement waveforms in a time-series axis, but the evaluation value calculation process is not limited thereto. As another example, the evaluation value S may be calculated from vibration intensities of the measurement waveforms in a frequency axis.

Figure 13:
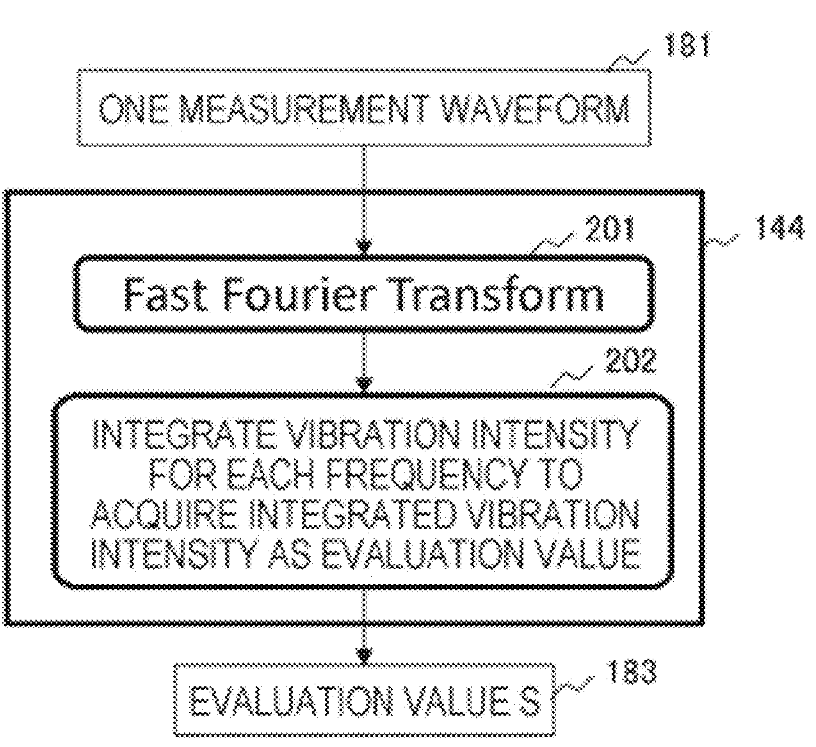
FIG. 13 is a diagram showing still another example of the flowchart of the evaluation value calculation process.

FIG. 13 is a diagram showing still another example of the flowchart of the evaluation value calculation process.

In the example of FIG. 13, in the evaluation value calculation process of step 144, first, the data processing device receives, as an input, one measurement waveform 181 from which the predetermined band is extracted by the band-pass filter in step 143, performs fast Fourier transform on the measurement waveform to convert the measurement waveform into a waveform on a frequency axis (step 201), and integrates the vibration intensity using the frequency as an integral variable to acquire the integrated vibration intensity as the evaluation value S (step 202).

Figure 14:
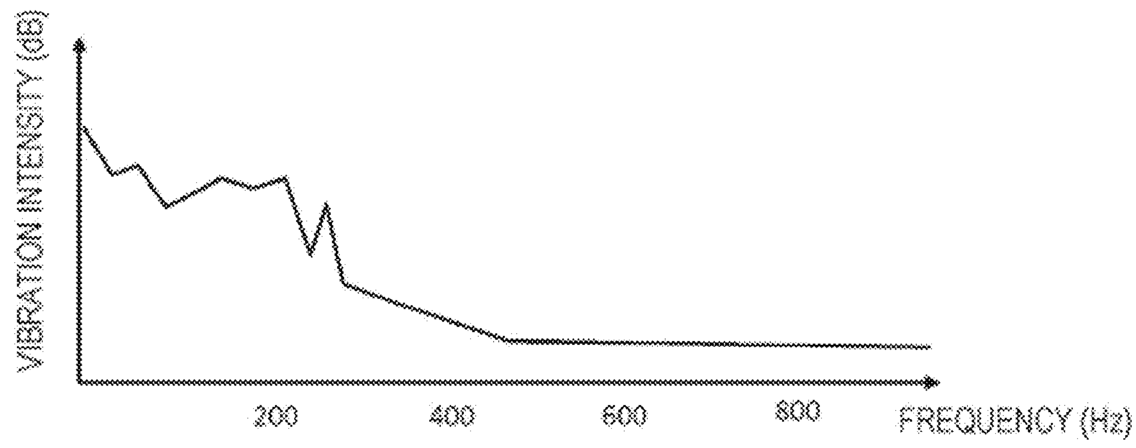
FIG. 14 is a schematic diagram showing a frequency feature of vibration intensities measured at a location with heavy vehicle traffic, such as along an arterial road.
Figure 15:
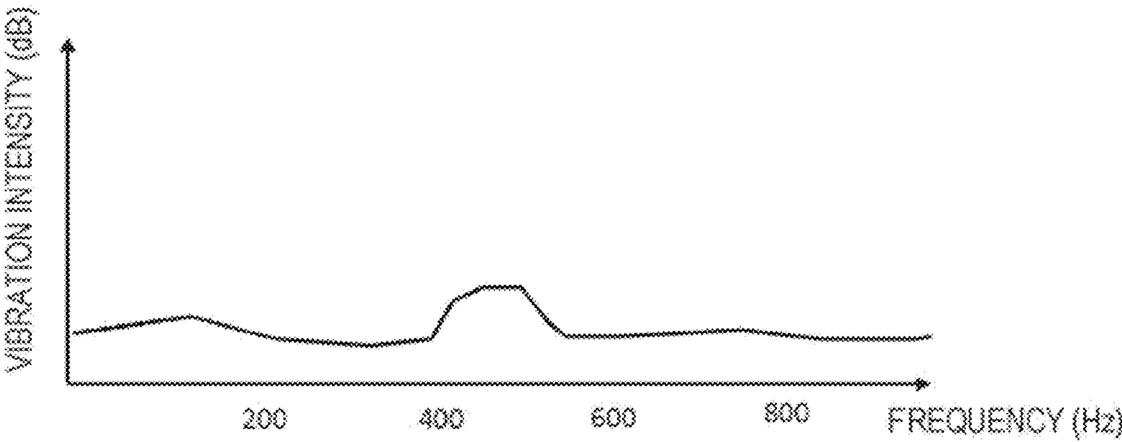
FIG. 15 is a schematic diagram showing a frequency feature of vibration intensities that are caused by water leakage vibrations and acquired in a quiet environment with a small environmental vibration.

FIG. 14 is a schematic diagram showing a frequency feature of vibration intensities measured at a location with heavy vehicle traffic, such as along an arterial road. FIG. 15 is a schematic diagram showing a frequency feature of vibration intensities that are caused by water leakage vibrations and acquired in a quiet environment with a small environmental vibration.

Vibrations due to passage of vehicles are often distributed on a low-frequency side of 400 Hz or less as shown in FIG. 14. On the other hand, as shown in FIG. 15, the water leakage vibrations may be distributed in the vicinity of 500 Hz with a mountain peak. In a case where the water leakage occurs at a location with heavy vehicle traffic, such as along an arterial road, it is conceivable to measure a vibration intensity in which the vibration intensity shown in FIG. 14 and the vibration intensity shown in FIG. 15 overlap each other. In such a case, after a frequency component of 400 Hz or less is extracted by the band-pass filter in step 143 of FIG. 7, the vibration intensity for each frequency is integrated in step 202 of FIG. 13 to calculate the evaluation value S corresponding to the energy of the environmental vibration that is included in the measurement waveform and derived from the traffic of the constant vehicle, and the measurement waveform having a small evaluation value S is selected, so that it is possible to determine the presence or absence of the water leakage with a suitable measurement waveform.

Returning to FIG. 4, in the autocorrelation coefficient calculation process of step 43, the data processing device calculates the autocorrelation coefficient of each of the selected W measurement waveforms. The autocorrelation coefficient can be calculated by the autocorrelation function shown in Equation (1).

Figure 16:
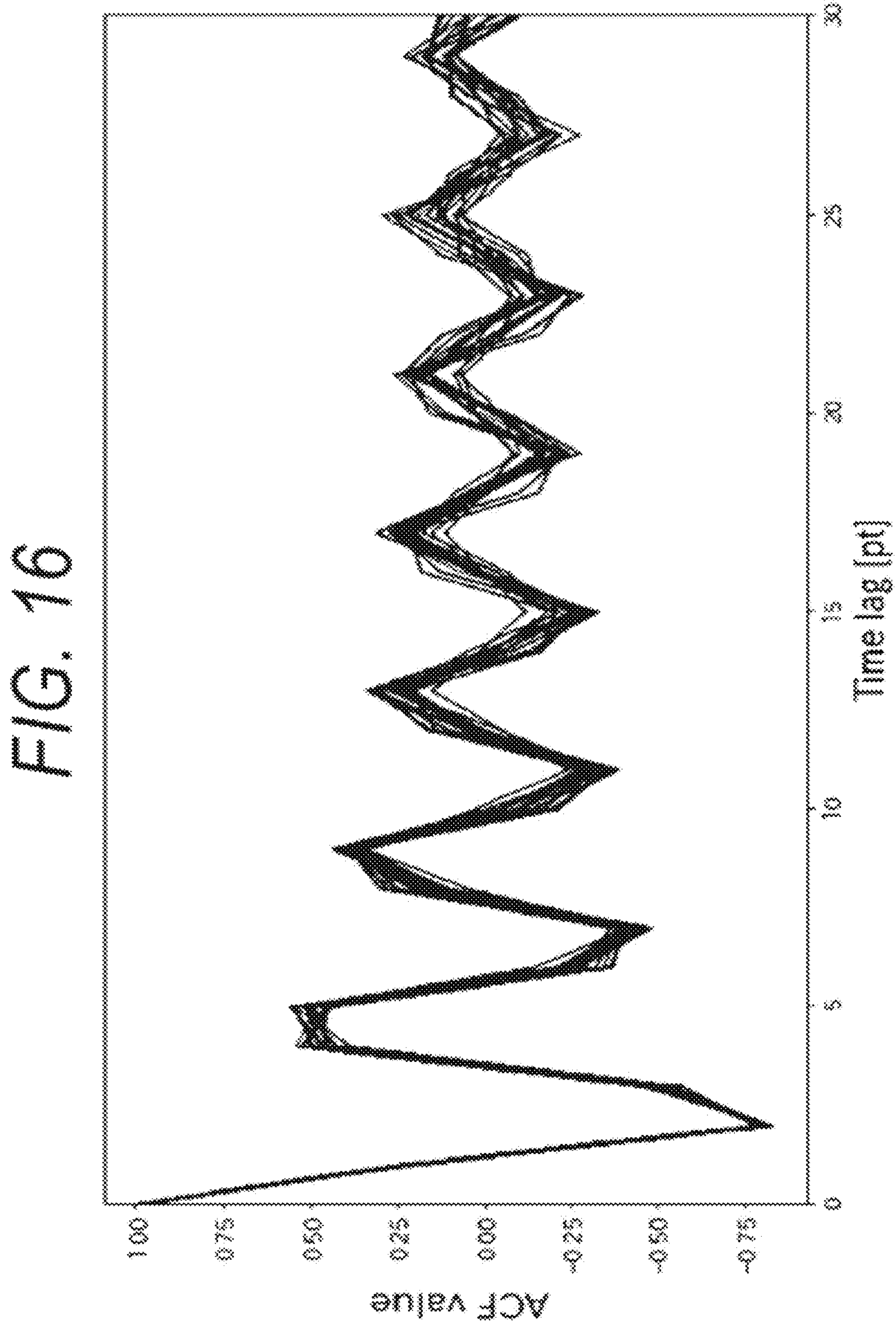
FIG. 16 is a graph showing a temporal change of an autocorrelation coefficient calculated in measurement waveforms including a water leakage signal.

FIG. 16 is a graph showing a temporal change of the autocorrelation coefficients calculated in measurement waveforms including a water leakage signal. In the graph of FIG. 16, a horizontal axis represents time, a unit corresponds to the number of data sampling points of the sensor, and a vertical axis represents the autocorrelation coefficient. In the graph of FIG. 16, autocorrelation coefficients of a plurality of measurement waveforms are shown in an overlapped manner. As shown in FIG. 16, since the autocorrelation coefficient of the water leakage vibration has a plurality of peaks as the time elapses, the data processing device acquires a peak position information set indicating positions of the plurality of peaks. In addition, in the water leakage vibration, since the autocorrelation coefficients in the measurement waveforms measured at any time point match, the peak positions of the peak position information set acquired from the plurality of measurement waveforms match.

Returning to FIG. 4, in the peak extraction process of step 44, the data processing device appropriately sets a sufficient time width in accordance with a sampling interval for extracting the plurality of peak positions, and extracts the plurality of peaks from waveforms measured at the time width. The peak position information set indicating the plurality of extracted peaks is stored in a nonvolatile storage element or a volatile storage element by the data storage process of step 45. The data processing device repeats the measurement waveform acquisition process of step 41 to the data storage process of step 45 until it is determined in step 46 that a predetermined number of peak position information sets are acquired. When it is determined that the predetermined number of peak position information sets are acquired, the data processing device outputs the predetermined number of peak position information sets as the autocorrelation peak position data 47.

In the autocorrelation coefficient calculation process, the measurement waveform selected in the measurement waveform selection process may be divided into a plurality of waveforms on the time axis, and a plurality of autocorrelation coefficients for each of the divided waveforms may be calculated. In addition, in the measurement waveform acquisition process, in order to avoid an influence of a noise source that intermittently generates an environmental vibration, the measurement waveform may be acquired at the same time point every day according to the predetermined measurement interval as shown in FIG. 5, or the measurement waveform may be acquired at different time points every day.

FIG. 17 is a schematic diagram showing measurement time points in a case where a time point at which a measurement waveform is acquired is changed daily. Referring to FIG. 17, a time point at which the measurement waveform is acquired is indicated by a character "Measurement". In addition, among the time points, a time point at which the measurement waveform selected based on the evaluation value S is acquired is indicated by hatching. Further, among the time points, a time point at which the measurement waveform with which the presence of the water leakage is determined is acquired is indicated by an underline. As shown in FIG. 17, a measurement waveform may be acquired along a schedule of measurement time points 91 set to different time points from day to day. In this case, the number of times of measurement N is not fixed, but the number of times of measurement N may be scheduled in advance so as to be changed every day as shown in FIG. 5, or the number of times of measurement N or the measurement time point D may be dynamically changed based on a previous water leakage determination result such as increasing the number of times of acquiring the measurement waveform on a next day when the presence of the water leakage is determined.

Figure 18:
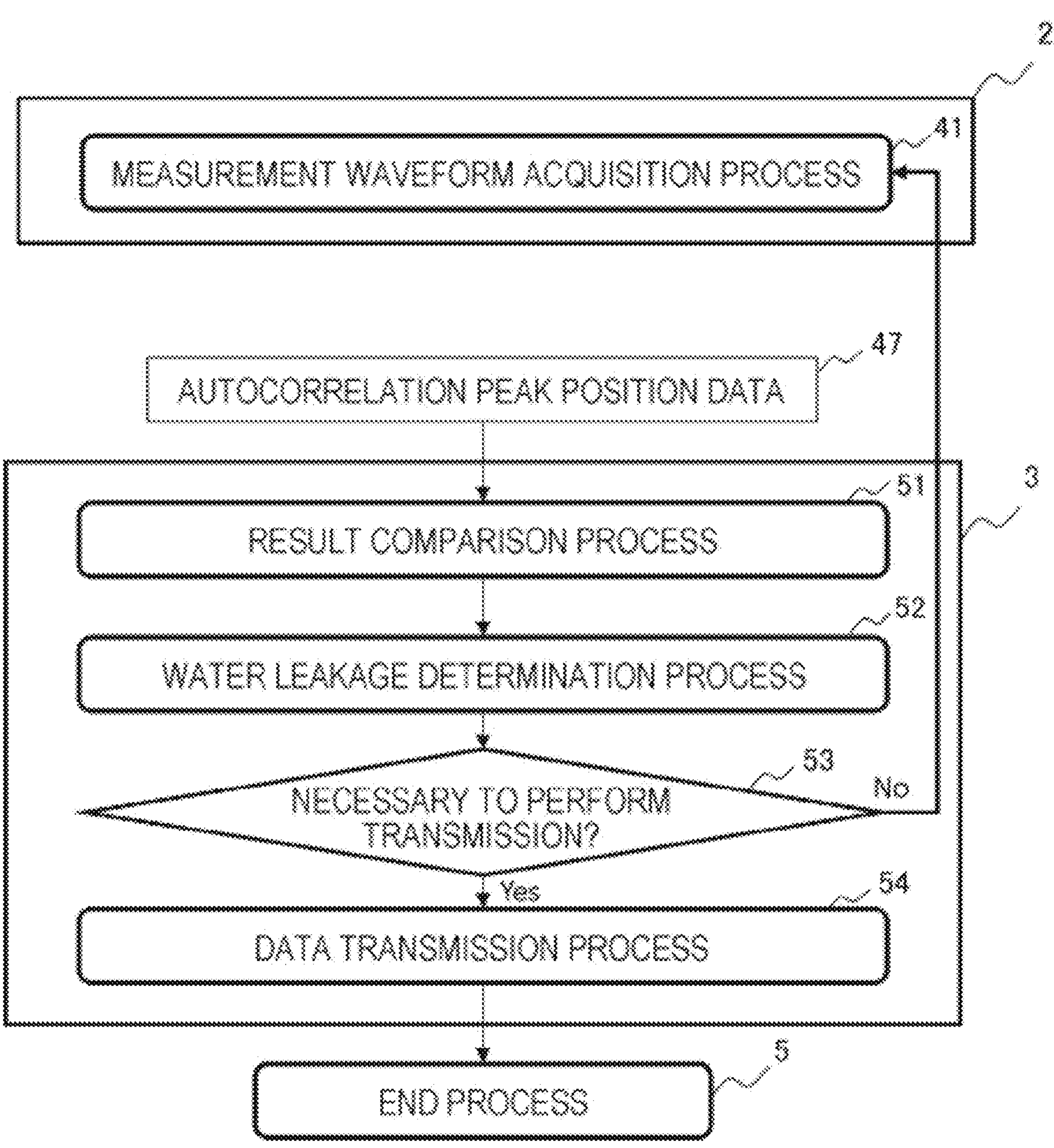
FIG. 18 is a diagram showing an example of a flowchart of a water leakage determination process based on autocorrelation peak position data.

FIG. 18 is a diagram showing an example of a flowchart of the water leakage determination process based on the autocorrelation peak position data.

As shown in FIG. 18, the data processing device receives the autocorrelation peak position data 47 as an input, executes a result comparison process (step 51), executes a water leakage determination process (step 52), determines whether it is necessary to transmit data to a host device based on a result of the water leakage determination process (step 53), returns to step 41 if not necessary, transmits data of the result of the water leakage determination process to the host device if necessary (step 54), and ends the process (step 5).

The result comparison process is a process of comparing a plurality of peak positions of two measurement waveforms with each other that are indicated by the peak position information sets included in the autocorrelation peak position data 47 among a plurality of measurement waveforms and calculating a matching degree indicating how much the peak positions of the two measurement waveforms match each other. The water leakage determination process is a process of determining the presence or absence of the water leakage based on the matching degree which is a result of the result comparison process.

Details of the result comparison process in step 51, the water leakage determination process in step 52, and the branch processes in step 53 will be described below.

In the result comparison process, for example, the data processing device may compare a plurality of peak positions of two measurement waveforms with each other to calculate the matching degree.

For example, a measurement waveform of four seconds is divided into 16 waveforms on the time axis, and an autocorrelation coefficient of each of the generated 16 waveforms of 250 ms is calculated. Six autocorrelation coefficients with less noise are selected from the obtained 16 autocorrelation coefficients. Then, six peak position information sets are extracted from the six autocorrelation coefficients. When the above process is repeated 15 times every hour while changing the time zone, the six peak position information sets are obtained from each of 15 measurement waveforms, so that a total of 6×15=90 peak position information sets are extracted. A pair of peak position information sets may be created from the 90 peak position information sets by a round-robin combination, a plurality of peak positions included in each pair of peak position information sets may be compared, a ratio of the number of matching peak positions to the total number of peak positions may be set as the matching degree, a pair of peak position information sets with the matching degree equal to or greater than a predetermined threshold may be extracted, a ratio of the number of pairs with the matching degree equal to or greater than the threshold to the number of all pairs may be set as an appearance ratio, and the appearance ratio may be used for the determination of the presence or absence of the water leakage in the water leakage determination process of step 52. The appearance ratio corresponds to the matching degree described above.

In the water leakage determination process, the presence of the water leakage is determined when the appearance ratio obtained by the result comparison process exceeds a predetermined threshold.

However, the result comparison process and the water leakage determination process are not limited to the above-described example. As another example, a process utilizing a graph network may be used. For example, a relationship between peak position information sets obtained from the respective measurement waveforms may be grasped using the graph network. Here, a graph is a figure represented by a plurality of points and sides connecting the points, and a graph in which the points and the sides have physical meanings is referred to as the graph network. In the case of the present embodiment, the measurement waveform to be compared is set as a point, and the matching degree between the peak positions of the two measurement waveforms is set as a side, so that a meaning can be given.

For example, a graph network in which points at which the matching degree of the peak positions exceeds 80%, which is a threshold, are connected by sides may be created, and the presence or absence of the water leakage may be determined using the graph network. Since the peak positions of the two measurement waveforms acquired at a site where the water leakage occurs have a high matching degree, a cluster in which the measurement waveforms connected by the sides are large is formed on the above-described graph network. On the other hand, since the peak positions of the two measurement waveforms acquired at a site where the water leakage does not occur are independent from each other and the matching degree between the peak positions is low, the measurement waveforms form a plurality of small clusters on the graph network. Therefore, the presence or absence of the water leakage may be determined based on information on the number of clusters or a size of the clusters.

In the branch processes of step 53, based on the result of the water leakage determination process, the data processing device determines whether it is necessary to transmit the data of the result to the host device. For example, the data processing device may determine that it is necessary to transmit data only when the presence of the water leakage is determined. Alternatively, the data processing device may transmit the data to the host device at a constant period regardless of the presence or absence of the water leakage, so that the host device can confirm whether its own device, which is a sensor terminal, is active or inactive. The host device can confirm that the data processing device is functioning normally by receiving data from the data processing device at the constant period.

<Device Configuration>

Hereinafter, a device configuration for implementing the present embodiment will be described with reference to the drawings.

Figure 19:
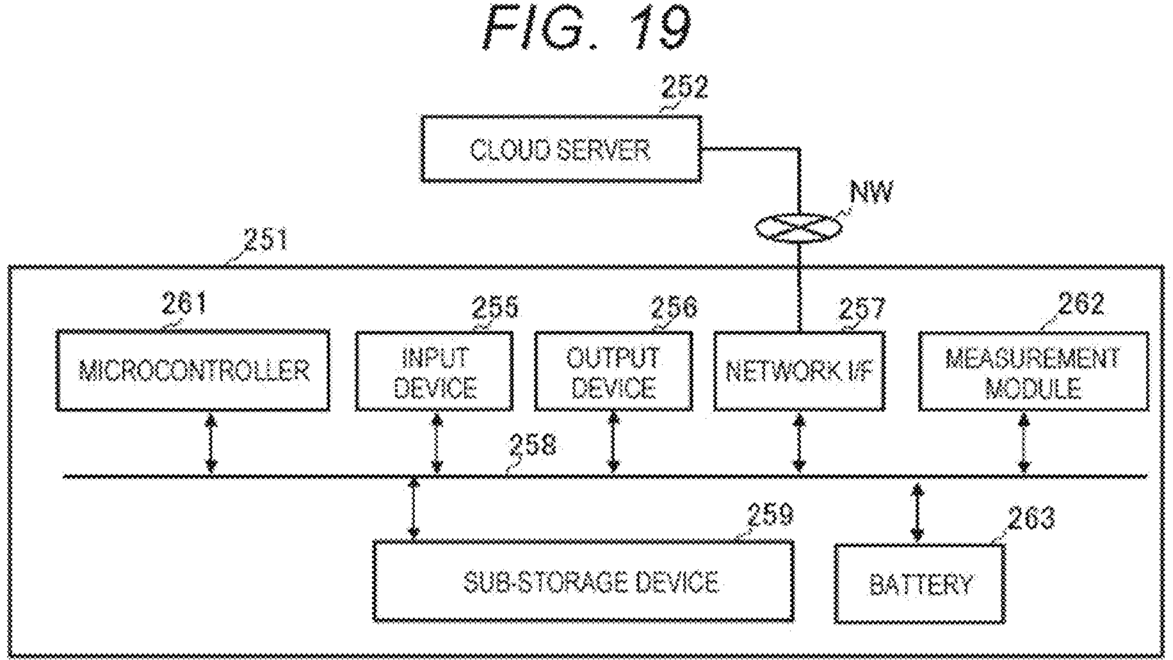
FIG. 19 is a block diagram showing an example of a hardware configuration of a data processing device.

FIG. 19 is a block diagram showing an example of a hardware configuration of the data processing device.

Referring to FIG. 19, a data processing device 251 includes an input device 255, an output device 256, a network interface (I/F) 257, a microcontroller 261, a measurement module 262, a sub-storage device 259, and a battery 263, which are connected to one another via a bus 258.

The microcontroller 261 includes a nonvolatile storage element in addition to a volatile storage element such as a random access memory (RAM), stores a program or the like to be processed in the nonvolatile storage element in advance, can read the program or the like from the nonvolatile storage element as necessary by a processor, and execute control of each unit of the sub-storage device 259 and the measurement module 262, data communication, arithmetic processing, and the like.

The sub-storage device 259 includes a nonvolatile storage element such as a hard disk drive (HDD), a solid state drive (SSD), or a flash memory, and stores programs, data, and the like.

The input device 255 is a device for receiving a user operation such as a switch and/or a button, and acquires information input by the user operation.

The output device 256 is a device for outputting information such as a light emitting diode (LED) and/or a speaker, and presents a result of the water leakage determination to the user by, for example, lighting the LED.

The measurement module 262 is the vibration sensor. The data processing device 251 may include a temperature sensor, a humidity sensor, or the like in addition to the vibration sensor.

The battery 263 is implemented by a battery or the like, and can cause the data processing device 251 to operate without power supply from the outside.

A network NW is a communication network, and may be a wired network or a wireless network. The network NW may be a global network such as the Internet or a local area network (LAN).

The network I/F 257 is an interface through which the data processing device 251 transmits and receives data to and from a cloud server 252 via the network NW. The data processing device 251 can transmit and receive data to and from the cloud server 252 connected to the network NW using the network I/F 257. The network I/F 257 can receive information received from the cloud server 252, and accordingly, the network I/F 257 also functions as an input device. In addition, the network I/F 257 can transmit data to the cloud server 252 via the network NW, and accordingly, the network I/F 257 also functions as an output device.

Figure 20:
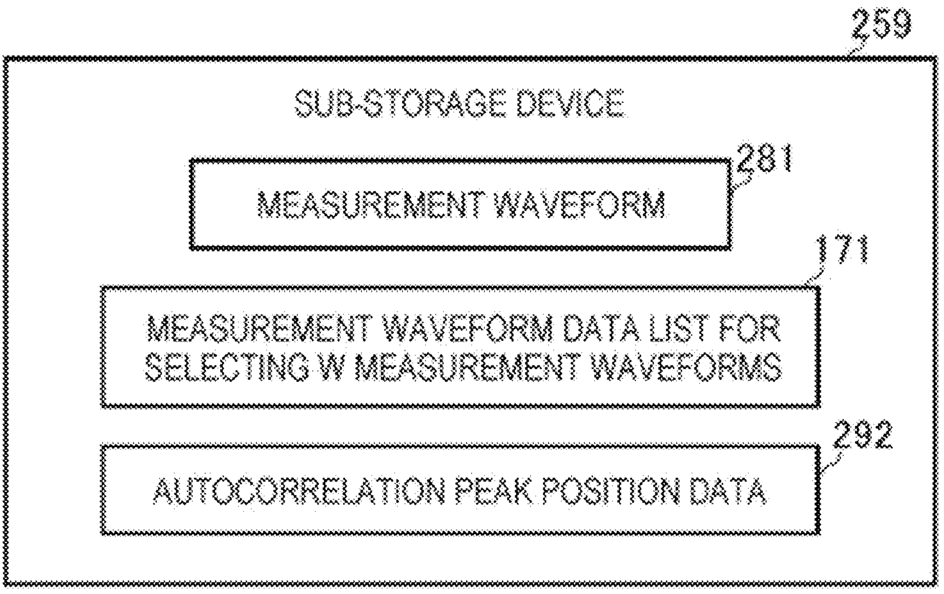
FIG. 20 is a schematic diagram showing an example of data stored in a sub-storage device.

FIG. 20 is a schematic diagram showing an example of data stored in the sub-storage device. As shown in FIG. 20, the sub-storage device 259 stores, for example, a measurement waveform 281, the measurement waveform data list 171 for selecting W measurement waveforms, and autocorrelation peak position data 292. The measurement waveform 281 is data of all the previous measurement waveforms acquired by the measurement waveform acquisition process of step 41 in FIG. 4. The measurement waveform data list 171 for selecting W measurement waveforms is a measurement waveform data list to be referred to when selecting the W measurement waveforms shown in FIG. 10, and includes the data name 152, the measurement time point D 153, the measurement time T 154, the index E 155, the evaluation value S 156, the valid data identifier V 157, and the like as an example.

The autocorrelation peak position data 292 is data indicating the temporal position of the peak in the graph representing the temporal change of the autocorrelation coefficient shown in FIG. 16.

The data processing device 251 according to the present embodiment may be connected to a user terminal 272 such as a personal computer or a tablet terminal.

Figure 21:
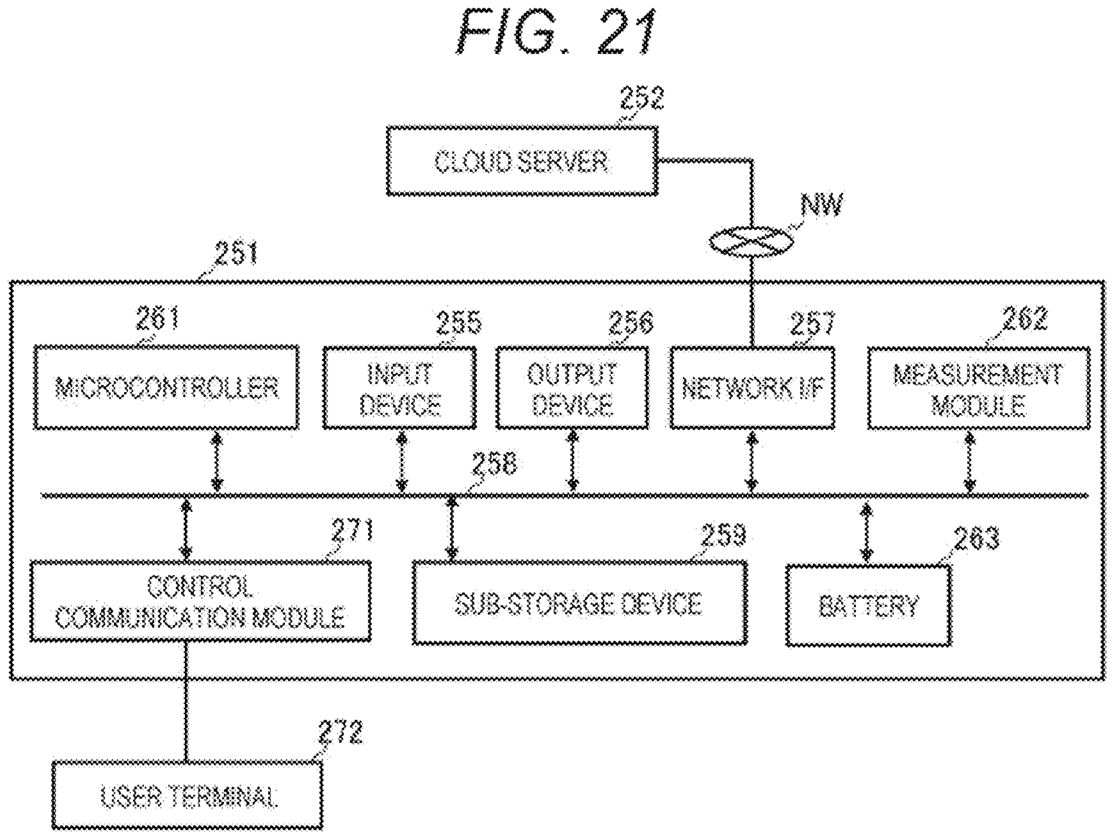
FIG. 21 is a block diagram showing another example of the hardware configuration of the data processing device.

FIG. 21 is a block diagram showing another example of the hardware configuration of the data processing device. The data processing device 251 of FIG. 21 is different from that of FIG. 19 in that the data processing device 251 includes a control communication module 271. The data processing device 251 of FIG. 21 communicates with an external user terminal 272 via the control communication module 271 by a wired or wireless communication line, so that the data processing device 251 can collect data accumulated in the sub-storage device 259 into the user terminal 272 or rewrite a processing program written in the microcontroller 261 from the user terminal 272.

<Output Screen>

The data processing device 251 can be operated in various ways from the cloud server 252, which is the host device, or the user terminal 272. Hereinafter, screens displayed on the cloud server 252 or the user terminal 272 when a user performs various operations from the cloud server 252 or the user terminal 272 on the data processing device 251 will be described with reference to the drawings.

Figure 22:
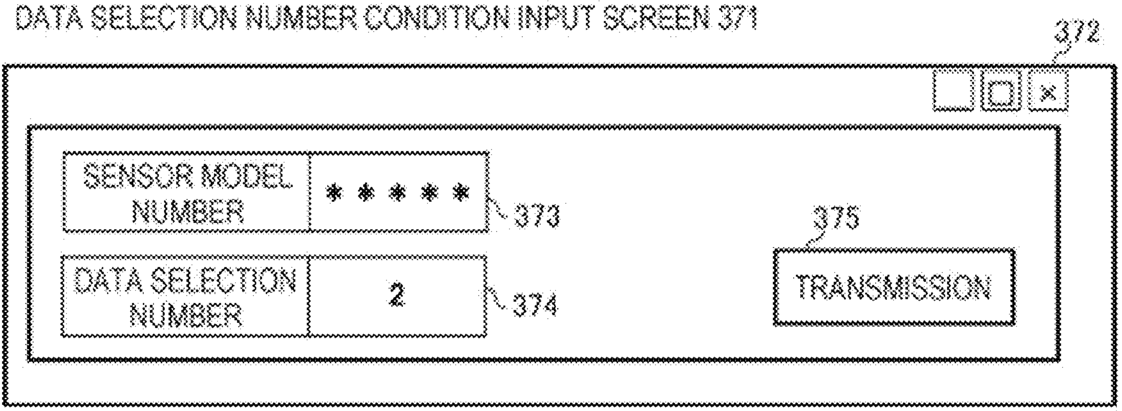
FIG. 22 is a diagram showing an example of an input screen for setting parameters in the data processing device.

FIG. 22 is a diagram showing an example of an input screen for setting parameters 372 in the data processing device. A data selection number condition input screen 371 shown in FIG. 22 is displayed on the cloud server 252 or the user terminal 272. The data selection number condition input screen 371 is a screen for setting the selection number W included in the setting parameter 121 given to the measurement waveform acquisition process shown in FIG. 5 for each sensor terminal. When the user designates the sensor terminal for which the selection number W is to be set in an input box 373, inputs the selection number W to be set in an input box 374, and presses a transmission button 375, information on the selection number W is transmitted to the designated sensor terminal and is set. Other various setting parameters 372 may be set from an input screen similar to the selection number W.

A method of setting various setting parameters 372 such as the selection number W is not limited to the method according to the operation input to the screen of a graphical user interface (GUI) exemplified here, and other methods may be used. For example, the setting of the setting parameter may be implemented by a method based on a character user interface (CUI) operation for inputting a command.

Figure 23:
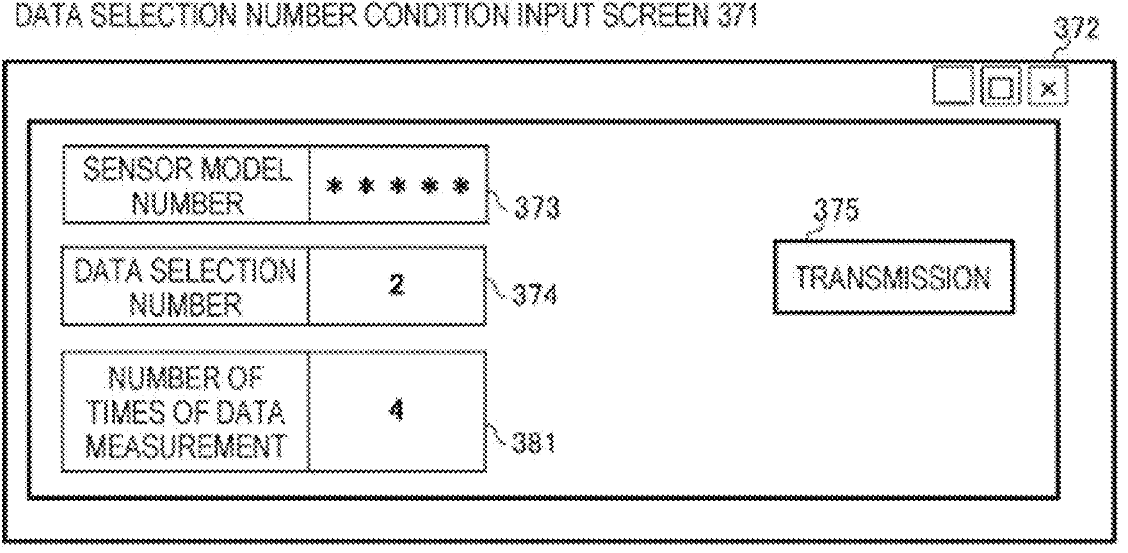
FIG. 23 is a diagram showing another example of the input screen for setting parameters in the data processing device.

Further, a plurality of parameters may be set from one input screen. FIG. 23 is a diagram showing another example of the input screen for setting the parameters 372 in the data processing device. As shown in FIG. 23, the parameter that can be set and transmitted from the outside is not limited to the data selection number W, and a predetermined number of times 381 of data measurement N or the like may be set.

As described above, in the present embodiment, a water leakage detection system includes a single sensor terminal implemented by the data processing device 251, and a monitoring system mounted on the cloud server 252 or the user terminal 272 and including a calculation unit (not shown) that manages measurement conditions and a display unit (not shown) that displays the presence or absence of the water leakage. In addition, the sensor terminal executes a step of measuring, using the vibration sensor, vibrations at least once or more times a day under a measurement condition designated by the calculation unit, a step of selecting a measurement waveform according to an evaluation value calculated according to any function, a step of calculating an autocorrelation function of the measurement waveform, a step of extracting a peak position of the autocorrelation function, a step of storing the peak position, a step of comparing the peak positions among a plurality of pieces of data, a step of determining a water leakage based on a comparison result, and a step of transmitting a determination result.

<Effects>

As described above, according to the present embodiment, it is possible to determine a water leakage in a single sensor terminal while avoiding an environmental vibration that intermittently occurs or occurs for a long time regardless of a time zone in one day, and thus, it is possible to reduce erroneous detection due to the environmental vibration or overlooking of a water leakage vibration and to reduce an opportunity to unnecessarily transmit data to a host device. Accordingly, it is possible to operate for a long period while reducing consumption of the battery and a communication cost. In addition, when a water leakage occurs, it is possible to perform data communication at an irregular interval only when the presence of the water leakage is determined, and it is possible to quickly perform notification of the occurrence of the water leakage on the display unit in the monitoring system, and to monitor a state in real time.

Further, according to the present embodiment, it is possible to obtain high water leakage determination accuracy. That is, in the related art, for example, the number of times that a signal level of one measurement result exceeds a predetermined threshold is counted to determine the water leakage. In this case, if the threshold is not appropriately set, an erroneous detection rate may increase. Further, in an environment where there are many noise signals, accurate determination is difficult to perform. On the other hand, in a water leakage determination method according to the present embodiment, a plurality of measurement results are compared with one another. As a result, even if the signal level and the peak position are different depending on a measurement site, as long as the signal level and the peak position have similar features, it is possible to accurately determine a water leakage, and thus, there is an advantage of high robustness against a measurement environment.

That is, according to the present embodiment, a water leakage detection method, a water leakage detection system, and a sensor terminal used therefor, which can perform highly reliable water leakage determination without being limited by an amount of data transmission and a communication frequency, can be provided.

In the above description, the sensor terminal acquires the measurement waveform, calculates the peak information of the autocorrelation function, performs the water leakage determination, and transmits the determination result to the monitoring system by the data communication. However, the sensor terminal may acquire the measurement waveform, and perform the calculation of the peak information of the autocorrelation function. The peak information is transmitted to the monitoring system, and the water leakage determination is performed on a monitoring system side. The sensor terminal may acquire the measurement waveform. The measurement waveform is transmitted to the monitoring system, and the calculation of the peak information of the autocorrelation function and the water leakage determination are performed on the monitoring system side.

In the present embodiment, the data processing device 251 determines the presence or absence of the water leakage based on the measurement waveform selected using any of the plurality of different evaluation values S described with reference to FIGS. 11, 12, and 13, but the embodiment is not limited to this. As another example, the data processing device 251 may determine the presence or absence of the water leakage based on the measurement waveform selected using each of the plurality of different evaluation values S, and determine the presence or absence of the water leakage based on the determination results. For example, when the presence of the water leakage is determined based on the measurement waveform selected by any one of the evaluation values S, the presence of the water leakage may be comprehensively determined.

Second Embodiment

A second embodiment differs from the first embodiment in the data selection process based on the evaluation value for each measurement waveform. Other than that, the second embodiment basically has the same configuration and operations as the first embodiment. Hereinafter, differences between the second embodiment and the first embodiment will be mainly described.

Figure 24:
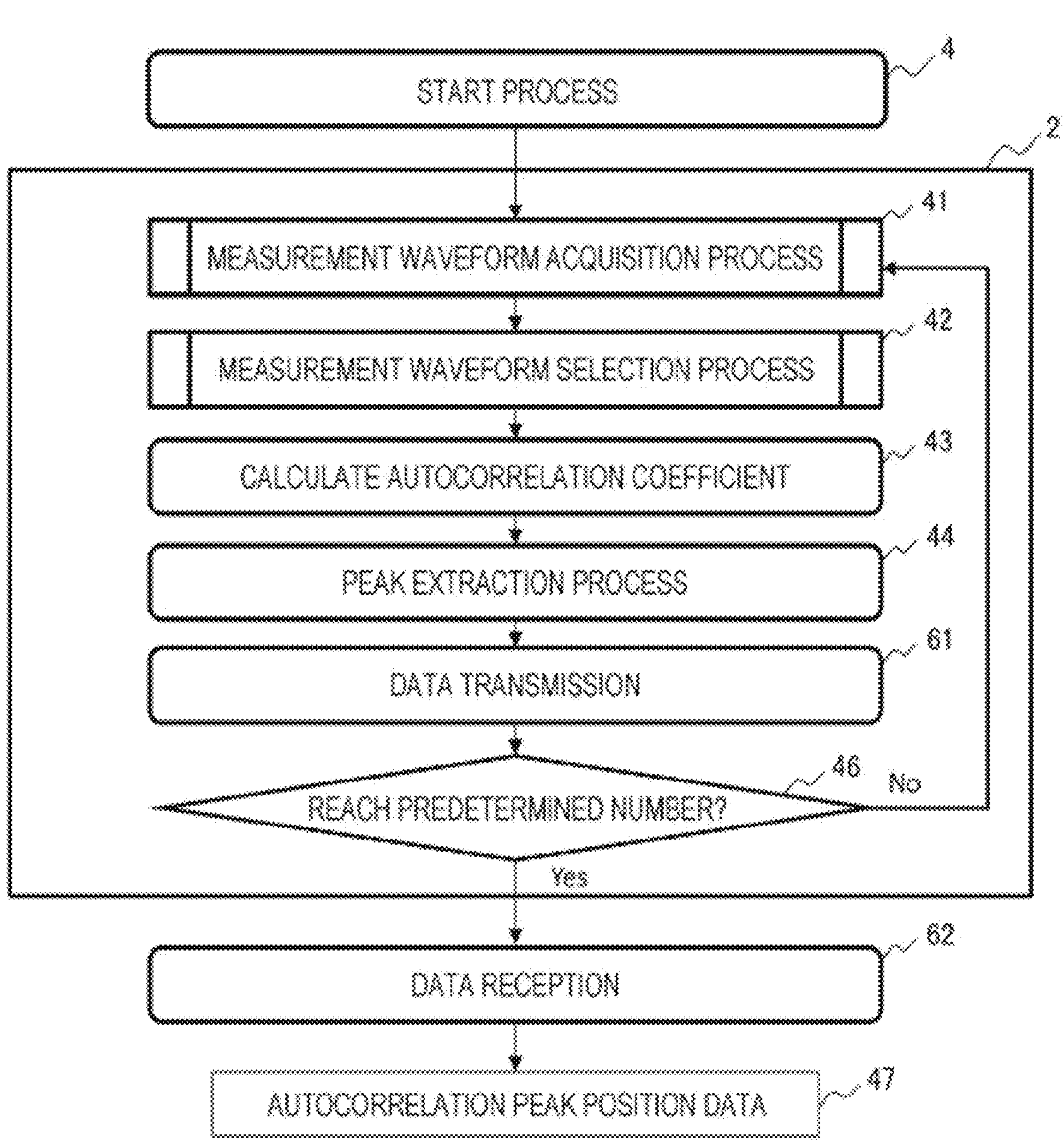
FIG. 24 is a diagram showing an example of a flowchart of a data selection process based on an evaluation value for each measurement waveform according to a second embodiment.

FIG. 24 is a diagram showing an example of a flowchart of a data selection process based on an evaluation value for each measurement waveform according to the second embodiment.

Unlike the first embodiment, in the data selection process based on the evaluation value for each measurement waveform according to the second embodiment, after executing the peak extraction process of step 44, the data processing device 251 transmits the data of the peak position of the autocorrelation coefficient of the measurement waveform to the cloud server 252 instead of storing the data in the device itself (step 61). Accordingly, the data of the peak position for each measurement waveform is accumulated in the cloud server 252. Then, when the number of the extracted autocorrelation peak positions reaches the predetermined number in step 46, the data processing device acquires the data of the peak positions of the autocorrelation coefficients for each measurement waveform accumulated so far from the cloud server 252 (step 62).

<Effects>

In the first embodiment, the data processing device 251 includes the sub-storage device 259 as shown in FIG. 19, and stores the autocorrelation peak position data 292 in the sub-storage device 259 as shown in FIG. 20. On the other hand, in a first modification, instead of the sub-storage device 259, the cloud server 252 stores the autocorrelation peak position data 292, and thus, the sub-storage device 259 is unnecessary or an amount of data recorded in the sub-storage device 259 can be reduced.

Figure 25:
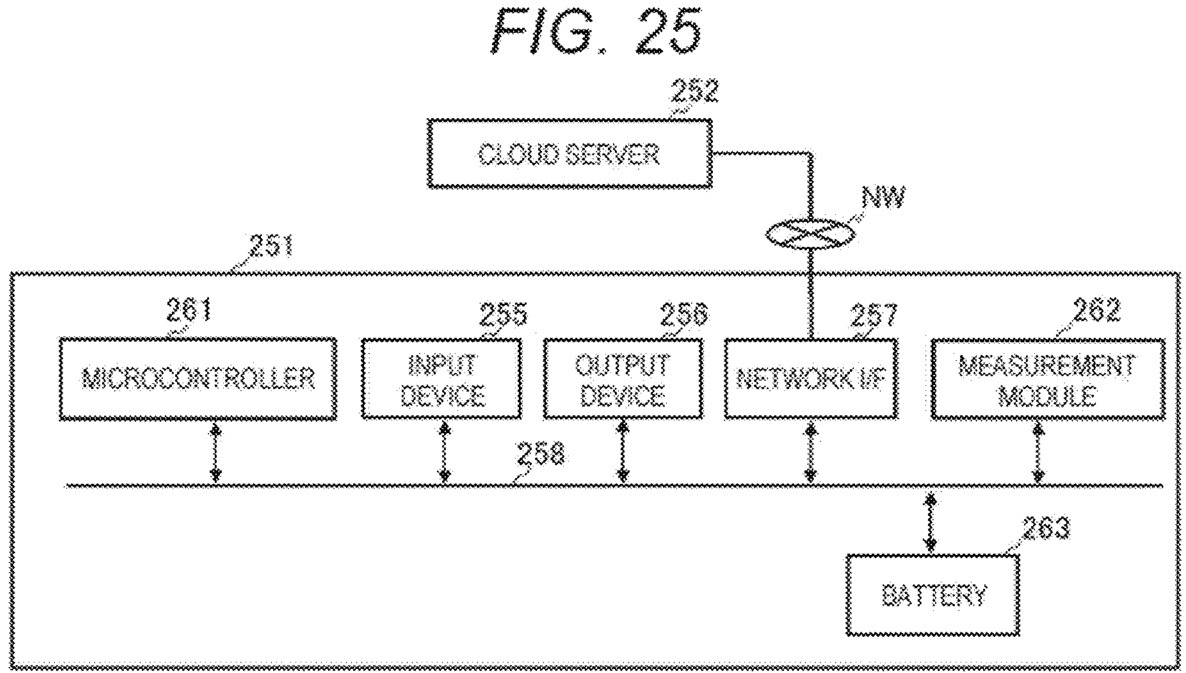
FIG. 25 is a block diagram showing an example of a hardware configuration of a data processing device according to the second embodiment.

FIG. 25 is a block diagram showing an example of a hardware configuration of the data processing device according to the second embodiment. The data processing device 251 according to the second embodiment shown in FIG. 25 is different from that of the first embodiment shown in FIG. 19 in that the data processing device 251 does not include the sub-storage device 259.

The data processing device 251 is a sensor terminal disposed in a narrow space such as a water control valve, and thus is required to be downsized. In this regard, by employing the configuration and the processes according to the second embodiment, as shown in FIG. 25, the sub-storage device 259 is not necessary, or the amount of data recorded in the sub-storage device 259 is reduced, and the data processing device 251 can be downsized.

In the second embodiment, in addition to the data processing device 251 and the cloud server 252, a data processing device 250 that acquires data from the cloud server 252 and executes the series of data processes for the water leakage detection shown in FIG. 3 may be provided.

Figure 26:
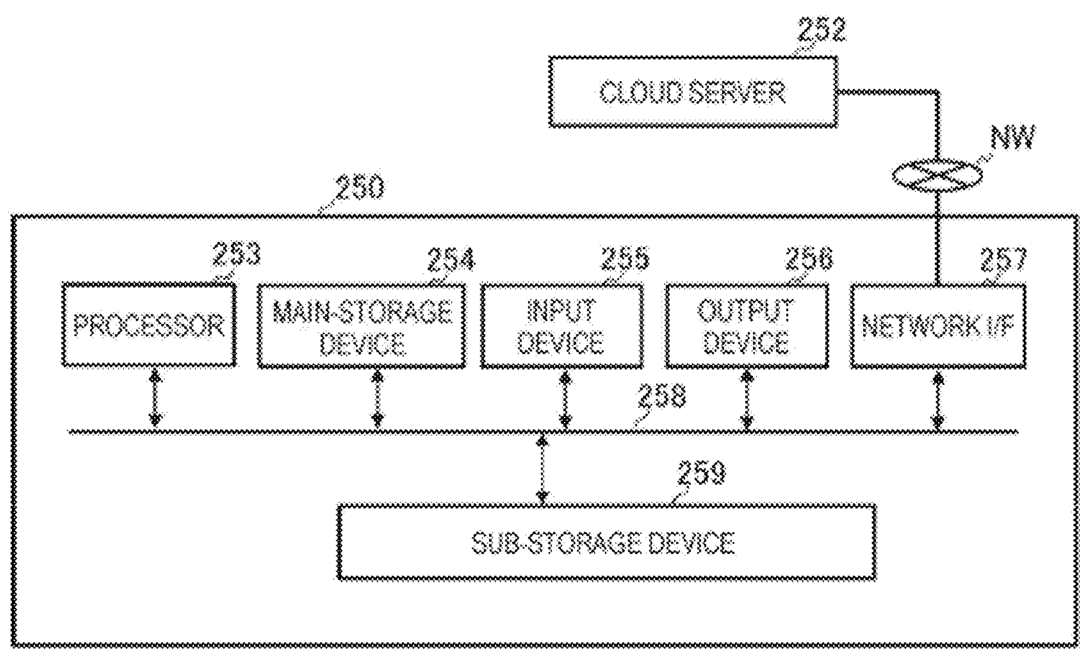
FIG. 26 is a block diagram showing an example of a hardware configuration of a data processing device added in the second embodiment.

FIG. 26 is a block diagram showing an example of a hardware configuration of a data processing device added in the second embodiment. Referring to FIG. 26, the data processing device 250 is different from the data processing device 251 in that the data processing device 250 does not include the measurement module 262 and the battery 263, but includes a processor 253 and a main-storage device 254 instead of the microcontroller 261.

Figure 27:
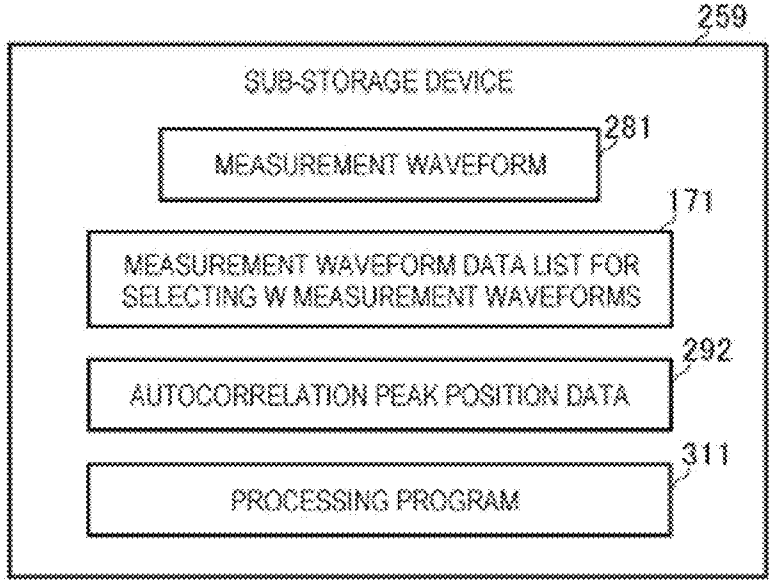
FIG. 27 is a schematic diagram showing an example of data stored in a sub-storage device of the data processing device added in the second embodiment.

FIG. 27 is a schematic diagram showing an example of data stored in a sub-storage device of the data processing device added in the second embodiment. Referring to FIG. 27, a processing program 311 is stored in the sub-storage device 259 of the data processing device 250. The processor 253 reads various types of data and the processing program 311 stored in the sub-storage device 259 to the main-storage device 254, and executes processes defined by the processing program 311.

Third Embodiment

A third embodiment differs from the first and second embodiments in the data selection process based on the evaluation value for each measurement waveform. Other than that, the third embodiment basically has the same configuration and operations as the first embodiment. Hereinafter, differences between the third embodiment and the first embodiment will be mainly described.

Figure 28:
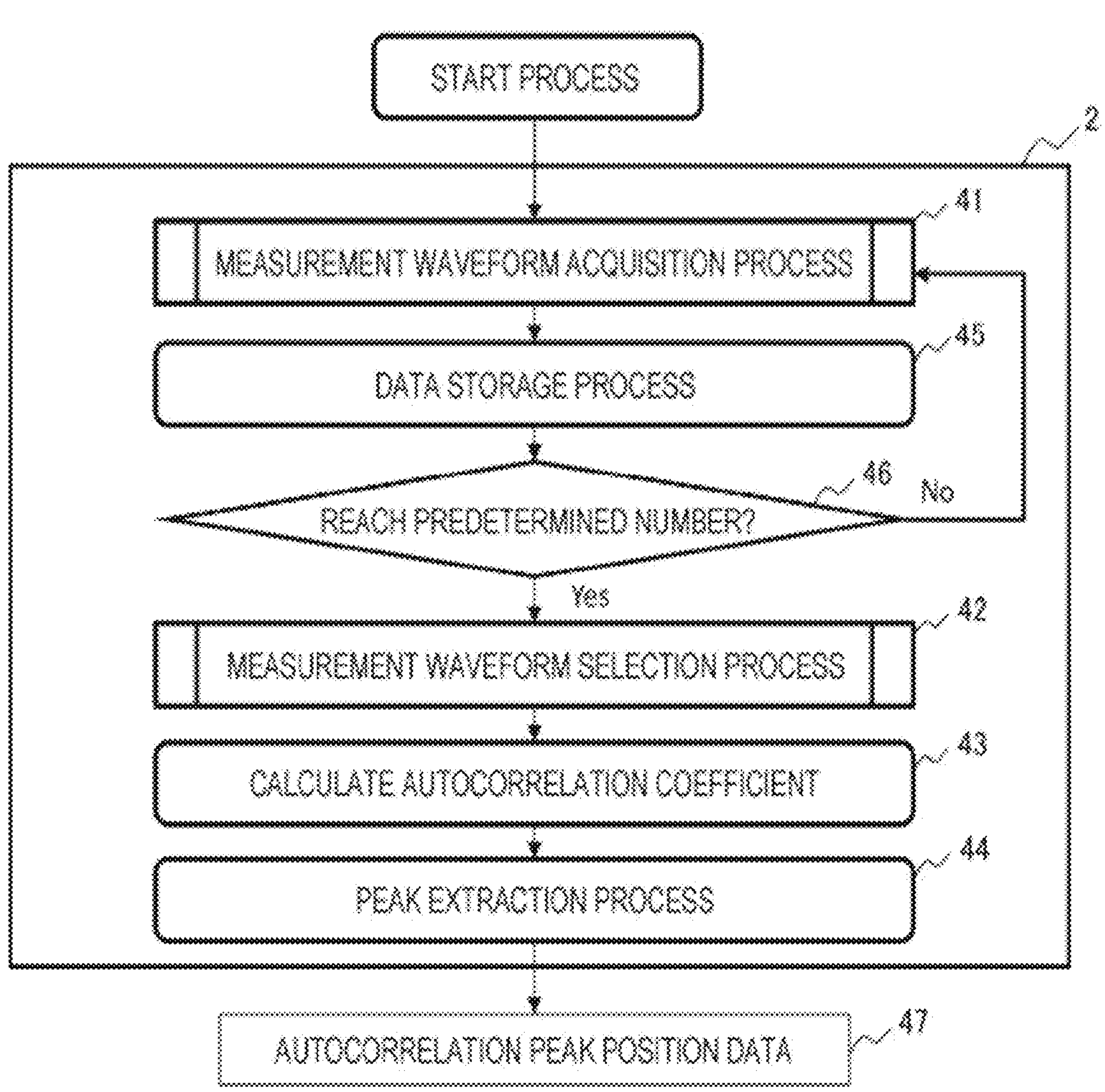
FIG. 28 is a diagram showing an example of a flowchart of a data selection process based on an evaluation value for each measurement waveform according to a third embodiment.

FIG. 28 is a diagram showing an example of a flowchart of the data selection process based on the evaluation value for each measurement waveform according to the third embodiment.

Unlike the first embodiment, in the data selection process based on the evaluation value for each measurement waveform in the third embodiment, after executing the measurement waveform acquisition processing of step 41, the data processing device 251 executes the data storage process of step 45, determines whether the number of autocorrelation peak positions reaches the predetermined number in step 46, and after the number of autocorrelation peak positions reaches the predetermined number, performs the measurement waveform selection process of step 42.

<Effects>

As a result, the data processing device 251 acquires the predetermined number of measurement waveforms, stores data of the measurement waveforms, refers to the data, and performs the necessary measurement waveform selection process, calculation of the autocorrelation coefficient, and the peak extraction process. Since the processes from the measurement waveform selection process of step 42 to the peak extraction process of step 44 can be completed by one time processing, there is an effect that a time required for the processing is shortened as compared with the first embodiment.

Fourth Embodiment

A fourth embodiment differs from the first embodiment in the data selection process based on the evaluation value for each measurement waveform. Other than that, the fourth embodiment basically has the same configuration and operations as the first embodiment. Hereinafter, differences between the fourth embodiment and the first embodiment will be mainly described.

Figure 29:
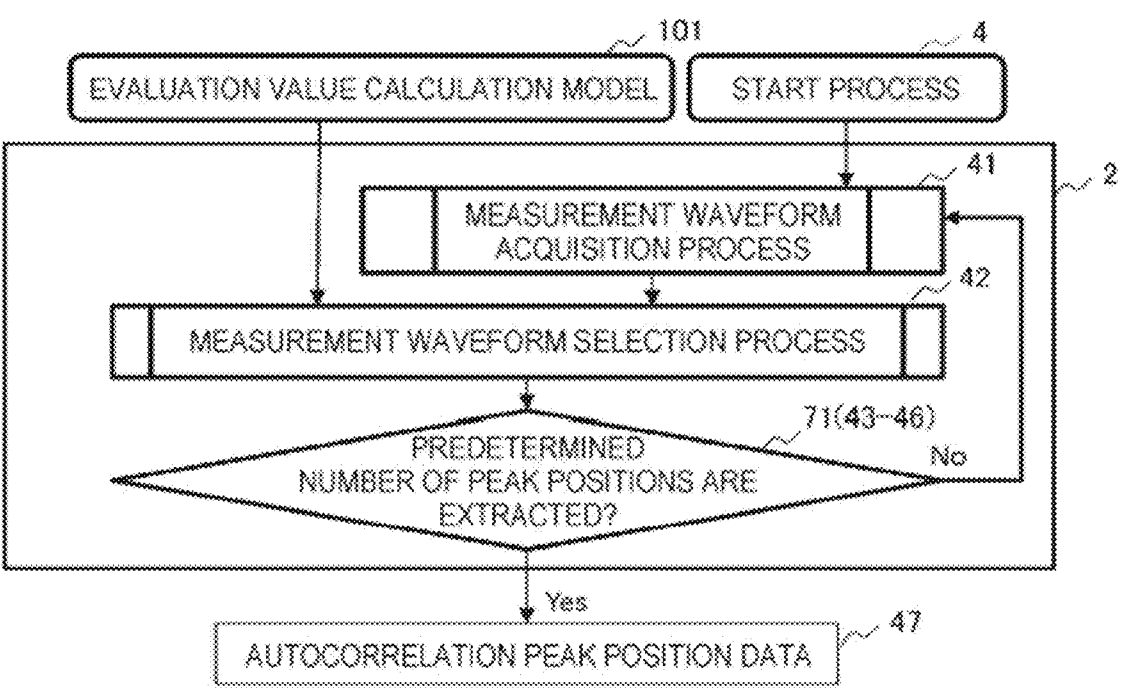
FIG. 29 is a diagram showing an example of a flowchart of a data selection process based on an evaluation value for each measurement waveform according to a fourth embodiment.

FIG. 29 is a diagram showing an example of a flowchart of the data selection process based on the evaluation value for each measurement waveform according to the fourth embodiment.

When FIG. 29 is compared with FIG. 4 of the first embodiment, in the data selection process based on the evaluation value for each measurement waveform in the fourth embodiment, unlike the first embodiment, the data processing device 251 calculates the evaluation value S using an evaluation value calculation model 101 given as an external input. More specifically, in the evaluation value calculation process included in the data selection process based on the evaluation value for each measurement waveform, the data processing device 251 calculates the evaluation value S using the evaluation value calculation model 101 given as the external input. Referring to FIG. 29, thereafter, the data processing device 251 executes a process of step 71 corresponding to the calculation of the autocorrelation coefficient of step 43 of FIG. 4, the peak extraction process of step 44, the data storage process of step 45, and the determination of step 46.

<Processing Procedure>

Figure 30:
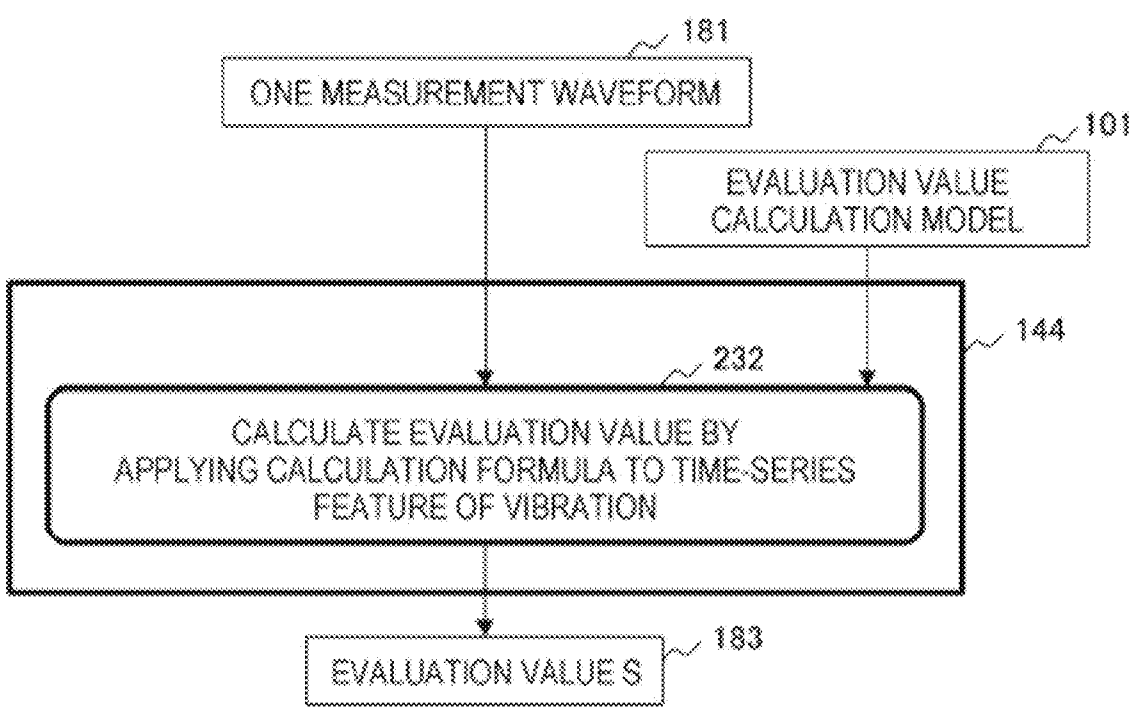
FIG. 30 is a diagram showing an example of a flowchart of an evaluation value calculation process according to the fourth embodiment.

FIG. 30 is a diagram showing an example of a flowchart of the evaluation value calculation process according to the fourth embodiment. When FIG. 30 is compared with FIG. 11 of the first embodiment, in the fourth embodiment, the data processing device 251 calculates the evaluation value S by applying a calculation formula given from the evaluation value calculation model 101 to a time-series feature of a vibration indicated in the measurement waveform 181 (step 232).

FIG. 31 is a diagram showing an example of a configuration of the evaluation value calculation model. The evaluation value calculation model 101 of FIG. 31 includes an evaluation value calculation model definition 241 and an evaluation value calculation model coefficient table 242. In the example of FIG. 31, the evaluation value calculation model definition 241 constitutes a definition formula of a polynomial equation having a polynomial order component in which vibration intensity data X(T1) to X(Tm) of the measurement waveforms at predetermined time points 243 is set as variables and predetermined constants a0 to aN (244 to 247) are set as coefficients. The coefficients a0 to aN (244 to 247) of the respective orders are given in the evaluation value calculation model coefficient table 242. By adopting the evaluation value calculation model defined by such a configuration, it is possible to constitute a more complicated evaluation function with respect to the time-series data of the measured vibration intensity, and it is possible to flexibly adjust the definition and the coefficient of the evaluation value calculation model according to the arrangement location of the vibration sensor or the determination result of the presence or absence of the water leakage, and to cope with various measurement environments having different characteristics of an environmental vibration.

The evaluation value calculation model 101 according to the fourth embodiment is not limited to the configuration in which the vibration intensity data X(T1) to X(Tm) of the measurement waveforms for each time are used as variables as shown in FIG. 31. FIG. 32 is a diagram showing another example of the configuration of the evaluation value calculation model. In the evaluation value calculation model 101 of FIG. 32, the evaluation value calculation model definition 361 a time differential of the vibration intensity data X(T1) to X(Tm) is used as a variable and the measurement waveforms at predetermined time points 243 are set as variables and predetermined constants a0 to aN (244 to 247) are set as coefficients.

In addition, the evaluation value calculation process according to the fourth embodiment is not limited to applying the calculation formula to a feature of the time-series axis of the measurement waveform 181 as shown in FIG. 13.

Figure 33:
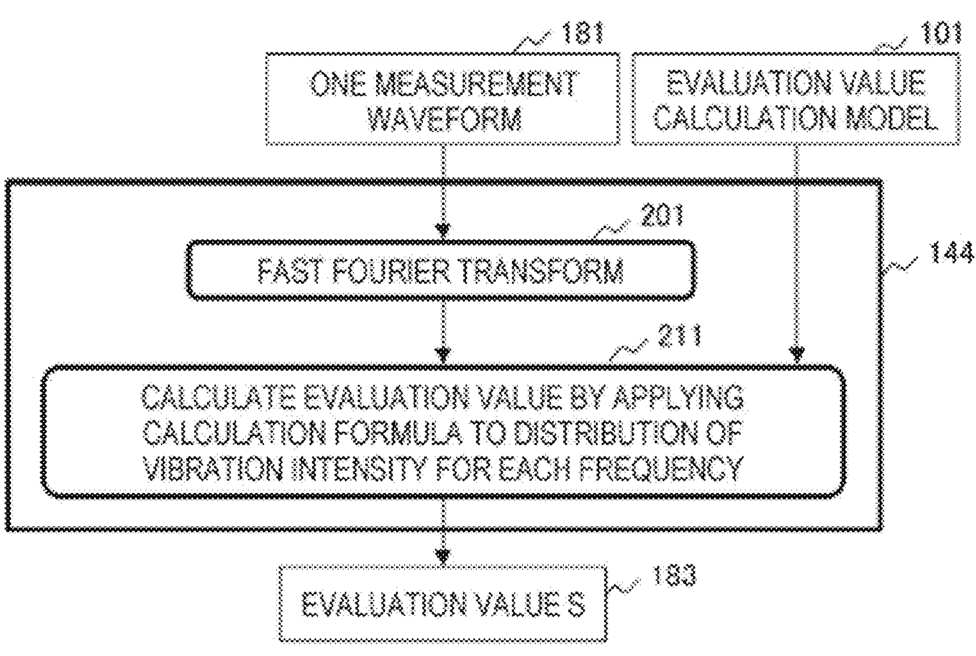
FIG. 33 is a diagram showing another example of the flowchart of the evaluation value calculation process according to the fourth embodiment.

FIG. 33 is a diagram showing another example of the flowchart of the evaluation value calculation process according to the fourth embodiment. In the example of FIG. 33, the data processing device 251 performs Fast Fourier Transform (FFT) on the measurement waveform 181 to convert the measurement waveform 181 into a distribution of vibration intensity for each frequency (step 201), and calculates the evaluation value S by applying the calculation formula to the vibration intensity of the frequency axis (step 211).

FIG. 34 is a diagram showing another example of the configuration of the evaluation value calculation model. The evaluation value calculation model 101 of FIG. 34 is an example in which the evaluation value calculation model 101 of FIG. 33 can be applied to the evaluation value calculation process of FIG. 33. The evaluation value calculation model 101 of FIG. 34 includes an evaluation value calculation model definition 221 and an evaluation value calculation model coefficient table 222 corresponding to variables of the frequency axis.

In the example of FIG. 34, the evaluation value calculation model definition 221 constitutes a definition formula having a polynomial order component with respect to the vibration intensity data X(F1) to X(Fm) of the measurement waveform for each frequency 223. The coefficients a0 to aN (224 to 225) of the respective orders are given in the evaluation value calculation model coefficient table 222. By adopting the evaluation value calculation model defined by such a configuration, it is possible to constitute a more complicated evaluation function with respect to the data obtained by converting the waveform of the measured vibration intensity by FFT, and it is possible to flexibly adjust the definition and the coefficient of the evaluation value calculation model according to the arrangement location of the vibration sensor or the determination result of the presence or absence of the water leakage, and to cope with various measurement environments having different characteristics of an environmental vibration.

Also in this case, the evaluation value calculation model 101 is not limited to a sum of the definition formulas as shown in FIG. 34. FIG. 35 is a diagram showing still another example of the configuration of the evaluation value calculation model. The evaluation value calculation model definition 351 shown in FIG. 35 is defined by a MAX function that extracts a maximum value from a plurality of variables obtained by frequency-differentiating the vibration intensity data X(F1) to X(Fm). As described above, the evaluation value calculation model may be defined using a statistical function such as a MAX function, or a frequency differential of the vibration intensity data X(F1) to X(Fm) of the measurement waveforms for each frequency may be used as a variable and the measurement waveforms at frequencies 223 are set as variables and predetermined constants a0 to aN (224 to 227) are set as coefficients.

<Effects>

Figure 36:
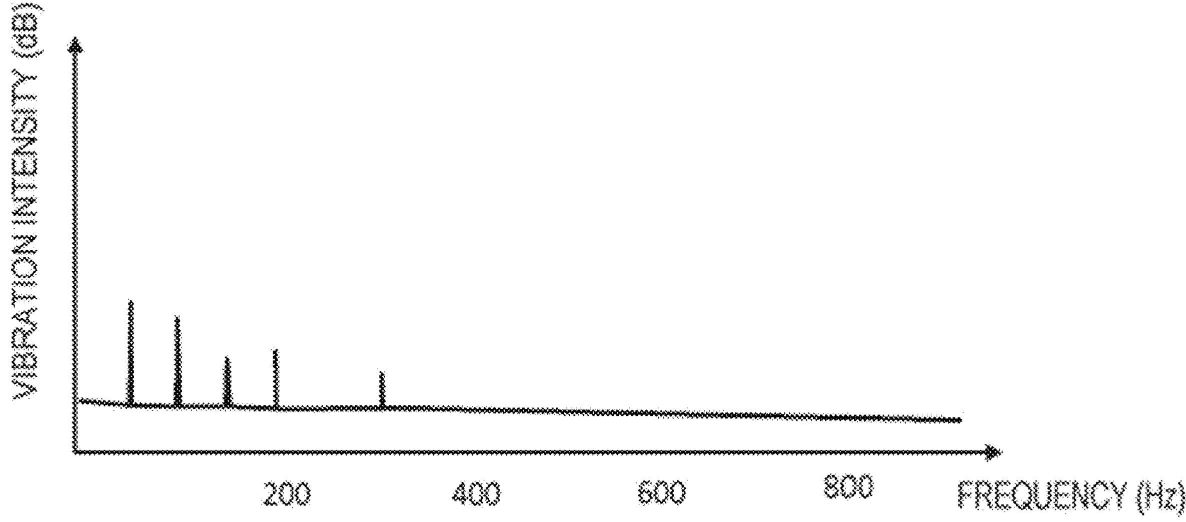
FIG. 36 is a diagram showing an example of environmental noise.

FIG. 36 is a diagram showing an example of environmental noise. The environmental vibration generated from a pump, a motor, or the like is a vibration having a specific frequency such as an overtone of 50 Hz. This type of environmental vibration has a steep peak in a specific frequency band as shown in FIG. 36. In such a case, if a differential of the vibration intensity in a frequency direction shown in FIG. 35 is used as the evaluation value S, it is effective that a fluctuation amount of the vibration intensity in the frequency direction is easily confirmed.

<Device Configuration>

The data processing device 251 according to the fourth embodiment basically has the same configuration as the data processing device 251 according to the first embodiment shown in FIG. 19 or FIG. 21.

Figure 37:
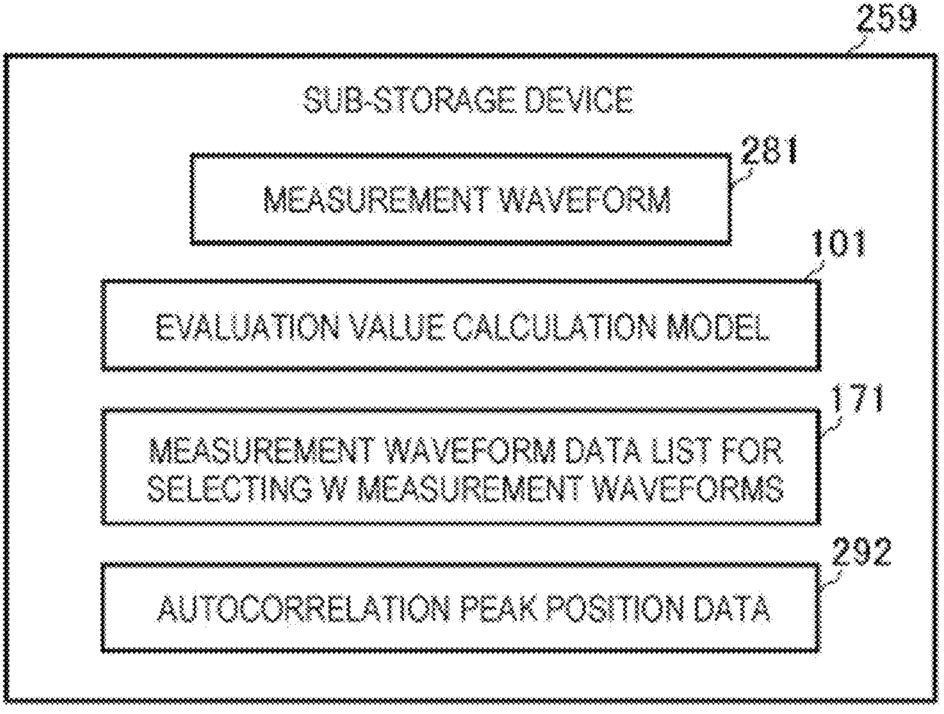
FIG. 37 is a schematic diagram showing an example of data stored in the sub-storage device according to the fourth embodiment.

FIG. 37 is a schematic diagram showing an example of data stored in the sub-storage device according to the fourth embodiment. The data processing device 251 according to the fourth embodiment is different from that according to the first embodiment in that the evaluation value calculation model 101 is held in advance in the sub-storage device 259 as shown in FIG. 37. The evaluation value calculation model 101 may be provided from the cloud server 252 via the network I/F 257 to the data processing device 251 having the configuration shown in FIG. 19, and may be updated as necessary. The evaluation value calculation model 101 may be provided from the user terminal 272 to the data processing device 251 having the configuration shown in FIG. 21 via the control communication module 271, and may be updated as necessary.

Fifth Embodiment

A fifth embodiment differs from the first embodiment in operations of the data selection process based on the evaluation value for each measurement waveform. Other than that, the fifth embodiment basically has the same configuration and operations as the first embodiment. Hereinafter, differences between the fifth embodiment and the first embodiment will be mainly described.

<Processing Procedure>

Figure 38:
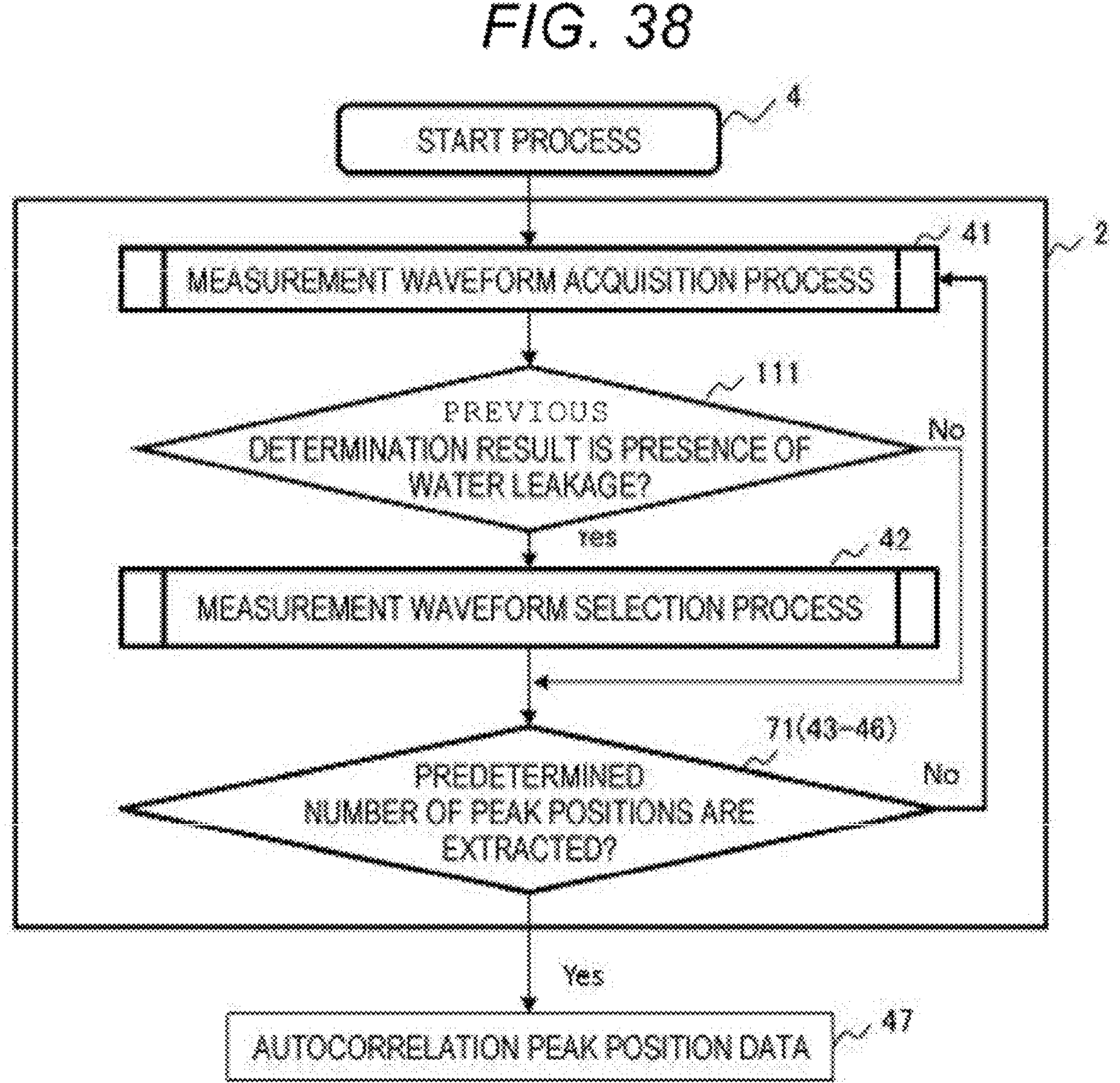
FIG. 38 is a diagram showing an example of a flowchart of a data selection process based on an evaluation value for each measurement waveform according to a fifth embodiment.

FIG. 38 is a diagram showing an example of a flowchart of the data selection process based on the evaluation value for each measurement waveform according to the fifth embodiment.

As shown in FIG. 38, in the data selection process based on the evaluation value for each measurement waveform in the fifth embodiment, unlike the first embodiment, the data processing device 251 executes the measurement waveform acquisition process of step S41, and then executes the measurement waveform selection process of step S42 when the presence of the water leakage is determined in the previous determination of the presence or absence of the water leakage of step 111, and does not execute the measurement waveform selection process of step S42 when the absence of the water leakage is determined. Thereafter, the data processing device 251 proceeds to a series of processes from step 43 to step 46 (step 71).

In the first embodiment, even when the waveform of the vibration intensity is measured a plurality of times a day, if the measurement waveform selection process is performed after the measurement waveform is acquired, only a part of the measurement waveforms is used for the determination of the presence or absence of the water leakage. Therefore, it takes time from the occurrence of the water leakage until the determination result of the presence of the water leakage is obtained, and there is concern about an influence on immediacy. In this regard, in the present embodiment, the determination of the presence or absence of the water leakage is performed without performing the measurement waveform selection process in a normal state, and the measurement waveform selection process is started after the presence of the water leakage is determined, so that a time until the notification of the occurrence of the water leakage is not lengthened. In addition, after the notification of the occurrence of the water leakage is performed, it is possible to more accurately confirm, by the measurement waveform selection process, whether the determination of the occurrence of the water leakage is due to the environmental vibration or due to vibration caused by an actual occurrence of the water leakage.

<Output Screen>

The data processing device 251 according to the present embodiment can be set in various ways from the cloud server 252, which is the host device, or the user terminal 272.

Figure 39:
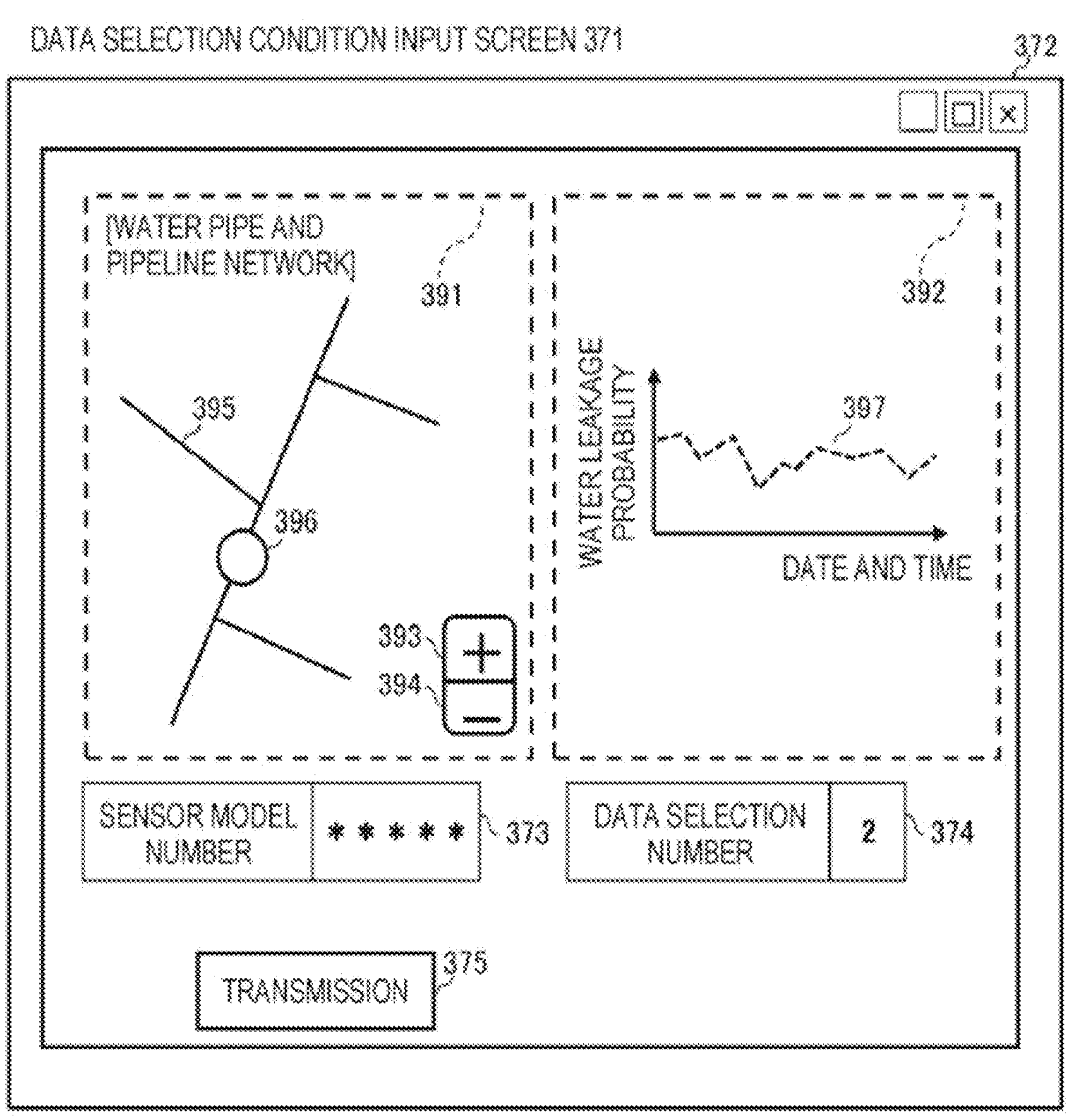
FIG. 39 is a diagram showing an example of a data selection condition input screen according to the fifth embodiment.

FIG. 39 is a diagram showing an example of a data selection condition input screen according to the fifth embodiment.

Referring to FIG. 39, the data selection condition input screen 371 is displayed. The data selection condition input screen 371 is a screen for inputting various settings 372 related to data selection. The data selection condition input screen 371 includes a region 391 indicating a sensor arrangement location, a region 392 indicating a transition of a previous water leakage determination result, an input box 373 into which a sensor model number can be input, an input box 374 into which a data selection number can be input, and a transmission button 375. The input box 373, the input box 374, and the transmission button 375 are the same as those in the first embodiment shown in FIG. 22.

In the region 391, a water pipeline 395 and a sensor arrangement location 396 are displayed on a schematic map. In the region 392, the transition of the previous determination result of the presence or absence of the water leakage is displayed in a graph 397. The user can designate a sensor at any sensor arrangement location by enlarging or reducing the display by an enlargement button 393 and a reduction button 394. In addition, the user can determine the data selection number W by confirming the information related to the sensor arrangement location displayed in the region 391 and the transition of the previous determination result on the presence or absence of the water leakage displayed in the region 392 on the screen. When the user inputs the determined data selection number W to the input box 374 and presses the transmission button 375, information on the selection number W is transmitted to the sensor terminal and is set.

Figure 40:
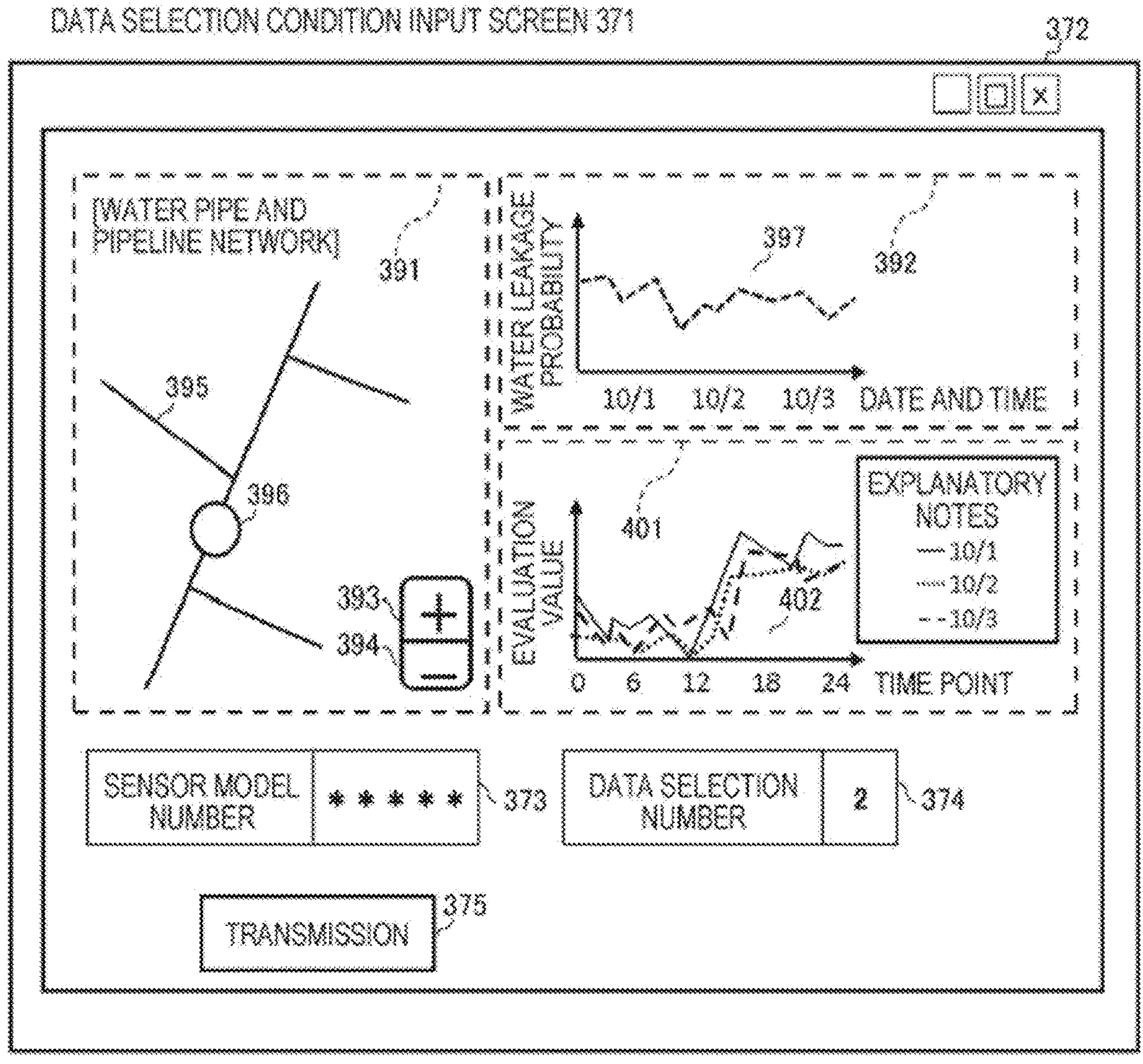
FIG. 40 is a diagram showing another example of the data selection condition input screen according to the fifth embodiment.

FIG. 40 is a diagram showing another example of the data selection condition input screen according to the fifth embodiment. The data selection condition input screen 371 for inputting various settings 372 related to data selection of FIG. 40 includes the transition of the previous determination result of the presence or absence of the water leakage is displayed in the graph 397, in addition to those of FIG. 39, a region 401 showing the transition of the vibration evaluation values S for each time zone and each date (402). The user can look at the evaluation value S displayed in the region 401 and use the evaluation value S as a clue to determine the data selection number W.

Although the various embodiments of the invention have been described in detail above, the invention is not limited to the embodiments and the modifications described above, and include various modifications and equivalent configurations within the scope of the appended claims. For example, the above-described embodiments and modifications are described in detail in order to make the invention easy to understand, and the invention is not necessarily limited to those including all the configurations described above. A part of the configurations of a certain embodiment may be replaced with a configuration of another embodiment. A configuration of another embodiment may be added to a configuration of a certain embodiment. A part of a configuration of each embodiment may be added to, deleted from, or replaced by another configuration.

The embodiments described above include the following matters. The matters included in the above-described embodiments are not limited to the following matters.

Matter 1

A data processing device that determines whether a fluid leaks from a pipeline network of the fluid based on a waveform of a vibration intensity measured from the pipeline network, the data processing device including: a memory configured to store a software program; and a processor configured to execute the software program. The processor acquires a plurality of pieces of waveform data of vibration intensities measured at different times from the pipeline network, calculates an evaluation value for evaluating how suitable or unsuitable the plurality of pieces of waveform data are for determining a presence or absence of a fluid leakage, selects waveform data to be used for determining a presence or absence of a fluid leakage from the plurality of pieces of waveform data based on the evaluation value, extracts a periodic characteristic from an autocorrelation coefficient of a vibration intensity of the selected waveform data, and determines whether the fluid leaks from the pipeline network based on a relationship between periodic characteristics of the selected waveform data. Accordingly, the evaluation value related to the use in the determination of the presence or absence of the fluid leakage is calculated for the measurement data, and the waveform data used in the determination of the presence or absence of the fluid leakage is selected based on the evaluation value, and thus, the fluid leakage can be detected with a reduced influence of an environmental vibration.

Matter 2

In the data processing device according to Matter 1, the processor creates a list in which the plurality of pieces of measured waveform data are rearranged in an ascending order or a descending order of the evaluation value, and selects the waveform data to be used for determining a presence or absence of a fluid leakage preferentially from a top of the list. Accordingly, the waveform data used for determining the presence or absence of the fluid leakage is selected from the list obtained by sorting the waveform data based on the evaluation value, and thus, the waveform data can be easily selected.

Matter 3

In the data processing device according to Matter 1, the processor selects a predetermined selection number of pieces of the waveform data to be used for determining a presence or absence of a fluid leakage from the plurality of pieces of measured waveform data. Accordingly, the number of pieces of waveform data to be used for determining the presence or absence of the fluid leakage is determined in advance, and thus, the process of selecting the waveform data becomes easier.

Matter 4

In the data processing device according to Matter 1, the processor divides the selected waveform data into a plurality of pieces of waveform data on a time axis, calculates an autocorrelation function of a vibration intensity for each of the plurality of pieces of waveform data obtained by dividing, and extracts a periodic characteristic from the autocorrelation function. Accordingly, by dividing the waveform data selected as suitable for the determination of the presence or absence of the fluid leakage into a plurality of pieces on the time axis and extracting the periodic characteristic from each autocorrelation function, it is possible to determine the presence or absence of the fluid leakage from the pipeline network based on the relationship of the periodic characteristics of a sufficient number pieces of waveform data suitable for the determination of the presence or absence of the fluid leakage.

Matter 5

In the data processing device according to Matter 1, a time point at which the waveform data is measured is different from day to day. Accordingly, since the waveform data are measured at different time points from day to day, when there is an environmental vibration occurring in the same time zone every day, it is possible to acquire a waveform without the environmental vibration on a daily basis and select a waveform without the environmental vibration as compared with the case according to the evaluation value.

Matter 6

In the data processing device according to Matter 1, the relationship between the periodic characteristics of the waveform data is an index based on a matching degree of temporal positions of peaks of vibration intensities indicated in the waveform data. Accordingly, the fluid leakage is determined based on the temporal matching degree of the peak position of the vibration intensity, and thus, it is possible to easily perform the determination using a property of the vibration caused by the fluid leakage from the pipeline network.

Matter 7

In the data processing device according to Matter 6, the processor creates a graph network by setting data on a periodic characteristic of an autocorrelation coefficient of a vibration intensity of the waveform data as a point and connecting points having a matching degree exceeding a predetermined threshold with a side, and determines whether the fluid leaks from the pipeline network using the graph network. Accordingly, the presence or absence of the fluid leakage is determined by the graph network, and thus, it is possible to easily determine the presence or absence of the leakage from a complicated relationship.

Matter 8

In the data processing device according to Matter 1, the processor determines, based on a previous determination result of the presence or absence of the fluid leakage, whether to select waveform data to be used for determination of the presence or absence of the fluid leakage from a plurality of pieces of acquired waveform data or to use all of the plurality of pieces of acquired waveform data for the determination of the presence or absence of the fluid leakage. Accordingly, it is possible to implement monitoring using both quick determination and highly accurate determination.

Matter 9

In the data processing device according to Matter 1, the processor displays a temporal transition of the evaluation value in a graph. Accordingly, the temporal transition of the evaluation value indicating whether the waveform data of the vibration waveform is suitable for the determination of the presence or absence of the fluid leakage is displayed in the graph, and thus, the user can recognize which time zone data is suitable.

Matter 10

In the data processing device according to Matter 1, the evaluation value is a value calculated based on at least one of a maximum amplitude of a vibration intensity, a vibration intensity in a specific frequency band, an integrated value of vibration intensities, and a time differential of vibration intensities. Accordingly, the influence of the environmental vibration according to the environment can be clearly eliminated.

Matter 11

In the data processing device according to Matter 10, the evaluation value is an integrated value of vibration intensities with a frequency as an integral variable. Accordingly, it is possible to select a waveform based on a difference in characteristics on the frequency axis between the environmental vibration and the vibration due to the leakage.

What is claimed is:

1. A data processing device that determines whether a fluid leaks from a pipeline network of the fluid based on a waveform of a vibration intensity measured from the pipeline network, the data processing device comprising:

a memory configured to store a software program; and a processor configured to execute the software program, wherein the processor is configured to acquire a plurality of pieces of waveform data of vibration intensities measured at different times from the pipeline network, calculate an evaluation value for evaluating how suitable or unsuitable the plurality of pieces of waveform data are for determining a presence or absence of a fluid leakage, select waveform data to be used for determining a presence or absence of a fluid leakage from the plurality of pieces of waveform data based on the evaluation value, extract a periodic characteristic from an autocorrelation coefficient of a vibration intensity of the selected waveform data, and determine whether the fluid leaks from the pipeline network based on a relationship between periodic characteristics of the selected waveform data, wherein the evaluation value is a value calculated based on at least one of a maximum amplitude of a vibration intensity, a vibration intensity in a specific frequency band, an integrated value of vibration intensities, and a time differential of vibration intensities.

2. The data processing device according to claim 1, wherein the processor is configured to create a list in which the plurality of pieces of measured waveform data are rearranged in an ascending order or a descending order of the evaluation value, and select the waveform data to be used for determining a presence or absence of a fluid leakage preferentially from a top of the list.

3. The data processing device according to claim 1, wherein the processor is configured to select a predetermined selection number of pieces of the waveform data to be used for determining a presence or absence of a fluid leakage from the plurality of pieces of measured waveform data.

4. The data processing device according to claim 1, wherein the processor is configured to divide the selected waveform data into a plurality of pieces of waveform data on a time axis, calculate an autocorrelation function of a vibration intensity for each of the plurality of pieces of waveform data obtained by dividing, and extract a periodic characteristic from the autocorrelation function.

5. The data processing device according to claim 1, wherein a time point at which the waveform data is measured is different from day to day.

6. The data processing device according to claim 1, wherein the relationship between the periodic characteristics of the waveform data is an index based on a matching degree of temporal positions of peaks of vibration intensities indicated in the waveform data.

7. The data processing device according to claim 6, wherein the processor is configured to create a graph network by setting data on a periodic characteristic of an autocorrelation coefficient of a vibration intensity of the waveform data as a point and connecting points having a matching degree exceeding a predetermined threshold with a side, and determine whether the fluid leaks from the pipeline network using the graph network.

8. The data processing device according to claim 1, wherein the processor is configured to determine, based on a previous determination result on a presence or absence of a fluid leakage, whether to select waveform data to be used for determination of the presence or absence of the fluid leakage from a plurality of pieces of acquired waveform data or to use all of the plurality of pieces of acquired waveform data for the determination of the presence or absence of the fluid leakage.

9. The data processing device according to claim 8, wherein the processor is configured to perform the determination of the presence or absence of the leakage without selecting waveform data used for the determination of the presence or absence of the fluid leakage based on the evaluation value, and when the presence of the leakage is determined in the determination, in a next determination, select waveform data used for the determination of the presence or absence of the fluid leakage based on the evaluation value, and perform the determination of the presence or absence of the leakage.

10. The data processing device according to claim 1, wherein the processor displays a temporal transition of the evaluation value in a graph.

11. The data processing device according to claim 1, wherein the evaluation value is an integrated value of vibration intensities with a frequency as an integral variable.

12. A data processing method that determines whether a fluid leaks from a pipeline network of the fluid based on a waveform of a vibration intensity measured from the pipeline network, the data processing method comprising:

by a data processing device that includes a memory and a processor, acquiring a plurality of pieces of waveform data of vibration intensities measured at different times from the pipeline network;

calculating an evaluation value for evaluating how suitable or unsuitable the plurality of pieces of waveform data are for determining a presence or absence of a fluid leakage;

selecting waveform data to be used for determining a presence or absence of a fluid leakage from the plurality of pieces of waveform data based on the evaluation value;

extracting a periodic characteristic from an autocorrelation coefficient of a vibration intensity of the selected waveform data; and determining whether the fluid leaks from the pipeline network based on a relationship between periodic characteristics of the selected waveform data, wherein the evaluation value is a value calculated based on at least one of a maximum amplitude of a vibration intensity, a vibration intensity in a specific frequency band, an integrated value of vibration intensities, and a time differential of vibration intensities.

13. A non-transitory computer readable medium upon which is embodiment programmed instructions which, when executed by a processor, cause the processor to perform operations to determine whether a fluid leaks from a pipeline network of the fluid based on a waveform of a vibration intensity measured from the pipeline network, the operations comprising:

acquiring a plurality of pieces of waveform data of vibration intensities measured at different times from the pipeline network;

calculating an evaluation value for evaluating how suitable or unsuitable the plurality of pieces of waveform data are for determining a presence or absence of a fluid leakage;

selecting waveform data to be used for determining a presence or absence of a fluid leakage from the plurality of pieces of waveform data based on the evaluation value;

extracting a periodic characteristic from an autocorrelation coefficient of a vibration intensity of the selected waveform data; and determining whether the fluid leaks from the pipeline network based on a relationship between periodic characteristics of the selected waveform data, wherein the evaluation value is a value calculated based on at least one of a maximum amplitude of a vibration intensity, a vibration intensity in a specific frequency band, an integrated value of vibration intensities, and a time differential of vibration intensities.

* * * * *